US010125251B2

(12) United States Patent
Olson et al.

(10) Patent No.: US 10,125,251 B2
(45) Date of Patent: Nov. 13, 2018

(54) FLUOROPOLYMER COMPOSITION INCLUDING AT LEAST ONE OLIGOMER

(71) Applicant: 3M INNOVATIVE PROPERTIES COMPANY, St. Paul, MN (US)

(72) Inventors: David B. Olson, Hudson, WI (US); Patricia M. Savu, Maplewood, MN (US); Diane North, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/320,544

(22) PCT Filed: Jun. 25, 2015

(86) PCT No.: PCT/US2015/037725
§ 371 (c)(1),
(2) Date: Dec. 20, 2016

(87) PCT Pub. No.: WO2015/200655
PCT Pub. Date: Dec. 30, 2015

(65) Prior Publication Data
US 2017/0198129 A1 Jul. 13, 2017

Related U.S. Application Data

(60) Provisional application No. 62/016,954, filed on Jun. 25, 2014.

(51) Int. Cl.
C08L 23/16 (2006.01)
C08L 27/16 (2006.01)
C08J 5/18 (2006.01)

(52) U.S. Cl.
CPC ............... C08L 27/16 (2013.01); C08J 5/18 (2013.01); C08J 2327/16 (2013.01); C08J 2433/12 (2013.01); C08L 2201/08 (2013.01); C08L 2203/16 (2013.01)

(58) Field of Classification Search
CPC .. C08L 27/16; C08L 2201/08; C08L 2203/16; C08J 5/18; C08J 2327/16; C08J 2433/12
See application file for complete search history.

(56) References Cited

U.S. PATENT DOCUMENTS

| | | |
|---|---|---|
| 2,803,615 A | 8/1957 | Ahlbrecht |
| RE24,906 E | 12/1960 | Ulrich |
| 3,553,179 A | 1/1971 | Bartlett |
| 4,329,384 A | 5/1982 | Vesley |
| 4,330,590 A | 5/1982 | Vesley |
| 4,379,201 A | 4/1983 | Heilmann |
| 4,508,882 A | 4/1985 | Yoshida et al. |
| 4,696,719 A | 9/1987 | Bischoff |
| 4,722,515 A | 2/1988 | Ham |
| 4,737,559 A | 4/1988 | Kellen |
| 4,804,717 A | 2/1989 | Ramey et al. |
| 4,842,893 A | 6/1989 | Yializis |
| 4,954,371 A | 9/1990 | Yializis |
| 5,018,048 A | 5/1991 | Shaw |
| 5,032,461 A | 7/1991 | Shaw |
| 5,073,611 A | 12/1991 | Rehmer |
| 5,084,537 A | 1/1992 | Stoyan |
| 5,097,800 A | 3/1992 | Shaw |
| 5,125,138 A | 6/1992 | Shaw |
| 5,157,091 A | 10/1992 | Masataka |
| 5,198,498 A | 3/1993 | Valet |
| 5,254,608 A | 10/1993 | McClure |
| 5,286,781 A | 2/1994 | Gotoh |

(Continued)

FOREIGN PATENT DOCUMENTS

| | | |
|---|---|---|
| EP | 0462069 | 12/1991 |
| EP | 0870778 | 10/1998 |

(Continued)

OTHER PUBLICATIONS

Affinito, "Polymer-Oxide Transparent Barrier Layers", Society of Vacuum Coaters 39th Annual Technical Conference Proceedings, 1996, pp. 392-397.

Affinito, "Vacuum deposited polymer/metal multilayer films for optical application", Thin Solid Films, 1995, vol. 270, pp. 43-48.

Shaw, "A New High Speed Process for Vapor Depositing Acrylate Thin Films: An Update", Society of Vacuum Coaters 36th Annual Technical Conference Proceedings, Apr. 25-30, 1993, pp. 348-352.

Shaw, "A New Vapor Deposition Process for Coating Paper and Polymer Webs", 6th International Vacuum Coating Conference in Reno, Oct. 28, 1992, p. 18-24.

(Continued)

Primary Examiner — Nathan M Nutter

(57) ABSTRACT

A composition that includes a blend of a fluoropolymer and an ultraviolet light-absorbing oligomer. The oligomer has a first divalent unit having a pendent ultraviolet absorbing group and a second divalent unit represented by formula (I): At least one of the following limitations is also met: the ultraviolet light-absorbing oligomer further comprises a third divalent unit comprising a pendent 2,2,6,6-tetramethylpiperidinyl group, or the composition further comprises a second oligomer comprising a third divalent unit comprising a pendent 2,2,6,6-tetramethylpiperidinyl group at least one of the second divalent units. Articles including the composition are disclosed. The composition can be an extruded film. A method of making such an extruded film is also disclosed.

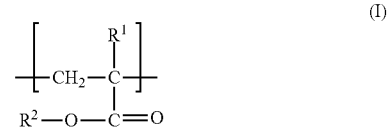

20 Claims, No Drawings

(56) References Cited

U.S. PATENT DOCUMENTS

| | | |
|---|---|---|
| 5,420,204 A | 5/1995 | Valet |
| 5,440,446 A | 8/1995 | Shaw |
| 5,540,978 A | 7/1996 | Schrenk |
| 5,547,908 A | 8/1996 | Furuzawa |
| 5,672,704 A | 9/1997 | Toan |
| 5,723,513 A | 3/1998 | Bonham |
| 5,807,635 A | 9/1998 | Cogen |
| 5,986,011 A | 11/1999 | Ellis |
| 6,045,864 A | 4/2000 | Lyons |
| 6,214,422 B1 | 4/2001 | Yializis |
| 6,231,939 B1 | 5/2001 | Shaw |
| 6,251,521 B1 | 6/2001 | Eian |
| 6,261,676 B1 | 7/2001 | Olson |
| 6,312,802 B1 | 11/2001 | Nishida |
| 6,335,102 B1 | 1/2002 | Tsubaki |
| 6,352,778 B1 | 3/2002 | Gillette |
| 6,414,236 B1 | 7/2002 | Kataoka |
| 6,500,887 B1 | 12/2002 | Tobita |
| 6,582,790 B2 | 6/2003 | Olson |
| 6,664,354 B2 | 12/2003 | Savu |
| 6,777,079 B2 | 8/2004 | Zhou |
| 6,923,921 B2 | 8/2005 | Flynn |
| 7,018,713 B2 | 3/2006 | Padiyath |
| 7,101,618 B2 | 9/2006 | Coggio |
| 7,236,290 B1 | 6/2007 | Zhang |
| 7,682,771 B2 | 3/2010 | Liu et al. |
| 7,935,772 B2 | 5/2011 | Makuda |
| 7,993,680 B2 | 8/2011 | Clemente |
| 8,722,791 B2 | 5/2014 | Saito |
| 9,371,471 B2 | 6/2016 | Palasz |
| 9,441,135 B2 | 9/2016 | Klun et al. |
| 9,670,300 B2 | 6/2017 | Olson |
| 2003/0012912 A1 | 1/2003 | Olson |
| 2004/0191550 A1 | 9/2004 | Maekawa |
| 2005/0129569 A1 | 6/2005 | Zhao et al. |
| 2007/0166562 A1 | 7/2007 | Swei |
| 2007/0276107 A1 | 11/2007 | Wada |
| 2009/0104447 A1 | 4/2009 | Kita |
| 2009/0283144 A1 | 11/2009 | Hebrink |
| 2010/0055418 A1 | 3/2010 | Takamatsu |
| 2010/0189983 A1 | 7/2010 | Numrich |
| 2011/0065826 A1 | 3/2011 | Shimohara |
| 2011/0151229 A1 | 6/2011 | Morita |
| 2011/0297228 A1* | 12/2011 | Li et al. ............... B32B 27/18 136/259 |
| 2012/0003451 A1 | 1/2012 | Weigel |
| 2012/0003484 A1 | 1/2012 | Roehrig |
| 2012/0011850 A1 | 1/2012 | Hebrink |
| 2012/0097220 A1 | 4/2012 | Miyashita |
| 2012/0227809 A1 | 9/2012 | Bharti |
| 2013/0096273 A1 | 4/2013 | Benz |
| 2015/0337096 A1* | 11/2015 | Olson et al. .......... C08F 220/24 525/200 |
| 2016/0200884 A1 | 7/2016 | Konokawa |
| 2017/0198119 A1 | 7/2017 | Olson |
| 2017/0198177 A1 | 7/2017 | Olson |

FOREIGN PATENT DOCUMENTS

| | | |
|---|---|---|
| EP | 0939441 | 9/1999 |
| EP | 1065731 | 1/2001 |
| EP | 1311637 | 5/2003 |
| GB | 229823 | 5/1925 |
| GB | 1407670 | 9/1975 |
| JP | S56163140 A | 12/1981 |
| JP | 4216807 | 8/1992 |
| JP | H04311754 A | 11/1992 |
| JP | 7-3242 | 1/1995 |
| JP | 7-310061 | 11/1995 |
| JP | H08188737 | 7/1996 |
| JP | 9-52916 | 2/1997 |
| JP | 9-59560 | 3/1997 |
| JP | 9-239921 | 9/1997 |
| JP | 10-7998 | 1/1998 |
| JP | 10-53681 | 2/1998 |
| JP | 1998-130456 | 5/1998 |
| JP | 10-168408 | 6/1998 |
| JP | 10-279832 | 10/1998 |
| JP | 11-293180 | 10/1999 |
| JP | 11-293181 | 10/1999 |
| JP | 11-348199 | 12/1999 |
| JP | 2000-123621 | 4/2000 |
| JP | 2000-154497 | 6/2000 |
| JP | 2001-1478 | 1/2001 |
| JP | 2001-19895 | 1/2001 |
| JP | 2001-123107 | 5/2001 |
| JP | 2001-323209 | 11/2001 |
| JP | 2002-60575 | 2/2002 |
| JP | 2002-146155 | 5/2002 |
| JP | 2002-194266 | 7/2002 |
| JP | 2002-201420 | 7/2002 |
| JP | 2002-256217 | 9/2002 |
| JP | 2003-40937 | 2/2003 |
| JP | 2003-266449 | 9/2003 |
| JP | 2004-148542 | 5/2004 |
| JP | 2004-161800 | 6/2004 |
| JP | 2004-217695 | 8/2004 |
| JP | 2005-42019 | 2/2005 |
| JP | 2005-187662 | 7/2005 |
| JP | 2005-290269 | 10/2005 |
| JP | 2007-204678 | 8/2007 |
| JP | 2011-68708 | 4/2011 |
| JP | 2012-72333 | 4/2012 |
| JP | 2012-111811 | 8/2012 |
| JP | 2012-188620 | 10/2012 |
| KR | 2006-0130397 | 12/2006 |
| KR | 2009-0089088 | 8/2009 |
| KR | 2014-0074581 | 6/2014 |
| WO | WO 2000-26973 | 5/2000 |
| WO | 2005/047384 | 5/2005 |
| WO | WO 2005-058377 | 6/2005 |
| WO | WO 2006-071981 | 7/2006 |
| WO | WO 2011-013638 | 2/2011 |
| WO | WO 2011-071847 | 6/2011 |
| WO | WO 2011-113008 | 9/2011 |
| WO | WO 2013-096543 | 6/2013 |
| WO | WO 2013-172930 | 11/2013 |
| WO | 2014/029344 | 2/2014 |
| WO | WO 2014-025983 | 2/2014 |
| WO | WO 2016-210140 | 12/2016 |

OTHER PUBLICATIONS

Shaw, "Use of Vapor Deposited Acrylate Coatings to Improve the Barrier Properties of Metallized Film", Society of Vacuum Coaters 37th Annual Technical Conference Proceedings, 1994, pp. 240-247.

Shaw, "Use of Evaporated Acrylate Coatings to Smooth the Surface of Polyester and Polypropylene Film Substrates", RadTech, 1996, pp. 701-707.

International Search Report for PCT International Application No. PCT/US2015/037725 dated Sep. 29, 2015, 5 pages.

* cited by examiner

FLUOROPOLYMER COMPOSITION INCLUDING AT LEAST ONE OLIGOMER

CROSS-REFERENCE TO RELATED APPLICATIONS

This application is a national stage filing under 35 U.S.C. 371 of PCT/US2015/037725, filed Jun. 25, 2015, which claims priority to U.S. Provisional Application No. 62/016,954, filed Jun. 25, 2014, the disclosure of which is incorporated by reference in its entirety herein.

BACKGROUND

Fluoropolymers are known to have a variety of useful properties, including cleanability, weather resistance, and chemical resistance. Such beneficial properties render fluoropolymers useful, for example, for a variety of outdoor applications including signage, films or coatings for architectural coverings, and protective coverings for photovoltaic modules.

It may be desirable to incorporate ultraviolet absorbers (UVAs) into materials exposed to ultraviolet (UV) radiation, for example, to protect a topcoat or topsheet or an underlying substrate or adhesive from UV degradation. Some UVAs can be dispersed into some compositions, but sometimes they can be lost due to volatilization or migration to the surface. Covalent incorporation of UVAs into certain compositions has been proposed. See, e.g., U.S. Pat. Appl. Pub. No. 2011/0297228 (Li et al.).

It has been reported that common UVAs can be incompatible with fluoropolymers. See, e.g., U.S. Pat. No. 6,251,521 (Eian et al.). This incompatibility can lead to degradation of physical or optical properties (e.g., loss of clarity or increased fogginess) as well as increased or accelerated loss of the UVA by migration, bleeding, or blooming.

SUMMARY

The present disclosure provides a composition that includes a fluoropolymer and an oligomer having a first divalent unit with a pendent ultraviolet absorbing group and optionally a third divalent unit that includes a pendent 2,2,6,6-tetramethylpiperidinyl group. Or the composition can include a ultraviolet light-absorbing oligomer with a pendent ultraviolet absorbing group and a second oligomer that includes a pendent 2,2,6,6-tetramethylpiperidinyl group. The oligomers are generally quite compatible with fluoropolymers such that the oligomers and fluoropolymers are readily blended together. Compositions including the fluoropolymers and oligomers provide protection from ultraviolet light and have good transparency to visible and infrared light. These properties are typically well-maintained even after accelerated UV exposure and exposure to high temperature and humidity conditions.

In one aspect, the present disclosure provides a composition that includes a blend of a fluoropolymer and an ultraviolet light-absorbing oligomer. The ultraviolet light-absorbing oligomer includes a first divalent unit having a pendent ultraviolet absorbing group and a second divalent unit represented by formula:

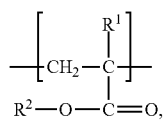

in which $R^1$ is hydrogen or methyl, and $R^2$ is alkyl having from 1 to 4 carbon atoms.

At least one of the following is also true: the ultraviolet light-absorbing oligomer further includes a third divalent unit having a pendent 2,2,6,6-tetramethylpiperidinyl group, or the composition further includes a second oligomer having a third divalent unit comprising a pendent 2,2,6,6-tetramethylpiperidinyl group at least one of the second divalent units. The nitrogen of the pendent 2,2,6,6-tetramethylpiperidinyl group is substituted by hydrogen, alkyl, oxy, alkoxy, or alkanone.

In another aspect, the present disclosure provides an article that includes the composition. The article may be, for example, photovoltaic device, vehicle wrap, graphic film, architectural film, or window film.

In some embodiments, the composition is an extruded film. Accordingly, in another aspect, the present disclosure provides a method of making the film disclosed herein. The method includes combining the fluoropolymer, the ultraviolet light-absorbing oligomer, and optionally the second oligomer to form the blend and extruding the blend into a film.

In fluoropolymer compositions including an ultraviolet light-absorbing oligomer with a first divalent unit having a pendent ultraviolet absorbing group and a second divalent unit, the retention of the ultraviolet light-absorbing oligomers disclosed herein after exposure to ultraviolet light is generally much superior to the retention of conventional ultraviolet light absorbers after exposure to the same conditions. When the ultraviolet light-absorbing oligomer further includes the third divalent unit having the pendent 2,2,6,6-tetramethylpiperidinyl group and/or when the composition includes the second oligomer including the second and third divalent units, the retention of the ultraviolet-light absorbing oligomers after exposure to ultraviolet light generally is remarkably even better. The 2,2,6,6-tetramethylpiperidinyl group in the oligomers disclosed herein can serve as a hindered amine light stabilizer (HALS), believed to be capable of scavenging free-radicals that can result from photodegradation. The 2,2,6,6-tetramethylpiperidinyl group is thus believed to protect the ultraviolet absorbing group from degradation in the compositions according to the present disclosure, increasing the photodurability of the compositions.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The term "ultraviolet absorbing group" or ultraviolet light-absorbing group refers to a covalently attached ultraviolet absorber (UVA). UVAs are known to those skilled in the art as being capable of dissipating absorbed light energy from UV rays as heat by reversible intramolecular proton transfer. UVAs are selected such that the oligomers in any of the embodiments of oligomers or second oligomers disclosed herein absorbs at least 70%, 80%, or 90% of incident light in a wavelength range from 180 nanometers (nm) to 400 nm.

"Alkyl group" and the prefix "alk-" are inclusive of both straight chain and branched chain groups and of cyclic groups. Unless otherwise specified, alkyl groups herein have up to 20 carbon atoms. Cyclic groups can be monocyclic or polycyclic and, in some embodiments, have from 3 to 10 ring carbon atoms.

The phrase "interrupted by at least one —O— group", for example, with regard to an alkyl (which may or may not be fluorinated), alkylene, or arylalkylene refers to having part of the alkyl, alkylene, or arylalkylene on both sides of the —O— group. For example, —CH$_2$CH$_2$—O—CH$_2$—CH$_2$— is an alkylene group interrupted by an —O—.

The term "fluoroalkyl group" includes linear, branched, and/or cyclic alkyl groups in which all C—H bonds are replaced by C—F bonds as well as groups in which hydrogen or chlorine atoms are present instead of fluorine atoms. In some embodiments, up to one atom of either hydrogen or chlorine is present for every two carbon atoms.

The term "polymer" refers to a molecule having a structure which essentially includes the multiple repetition of units derived, actually or conceptually, from molecules of low relative molecular mass. The term "polymer" encompasses oligomers.

All numerical ranges are inclusive of their endpoints and nonintegral values between the endpoints unless otherwise stated (e.g., 1 to 5 includes 1, 1.5, 2, 2.75, 3, 3.80, 4, 5, etc.).

DETAILED DESCRIPTION

Ultraviolet light-absorbing oligomers useful in the compositions according to the present disclosure are linear or branched. Typically, they are linear oligomers. They may be random copolymers or block copolymers. They are not covalently crosslinked. Accordingly, they may be dissolved in solvents and have measurable molecular weights as opposed to covalently crosslinked polymers, which cannot be dissolved in solvents and have molecular weights approaching infinity. In some embodiments, the oligomers may be considered thermoplastic. Thermoplastics are typically melt-processable such as by an extrusion process. Oligomers useful in the compositions according to the present disclosure have a number average molecular weight of up to 150,000 grams per mole. In some of these embodiments, the oligomer has a number average molecular weight of up to 120,000, 100,000, 90,000, 80,000, 70,000, 60,000, 50,000, 40,000, 30,000, 20,000, or less than 20,000 grams per mole (e.g., up to 19,500, 19,000, or 18,500 grams per mole). In some embodiments, the number average molecular weight of the oligomer may be at least 1000 grams per mole, greater than 5,000 grams per mole, or greater than 7,500 grams per mole. Useful ultraviolet light-absorbing oligomers typically have a distribution of molecular weights and compositions. Weight and number average molecular weights can be measured, for example, by gel permeation chromatography (i.e., size exclusion chromatography) using techniques known to one of skill in the art.

Ultraviolet light-absorbing oligomers useful in the compositions according to the present disclosure in any of their embodiments include a first divalent unit comprising a pendent ultraviolet absorbing (UVA) group. Any class of UVA may be useful for providing the UVA group. Examples of useful classes include benzophenones, benzotriazoles, triazines, cinnamates, cyanoacrylates, dicyano ethylenes, salicylates, oxanilides, and para-aminobenzoates. In some of these embodiments, the pendent ultraviolet absorbing group comprises a triazine, a benzophenone, or a benzotriazole. In some embodiments of the compositions according to the present disclosure, the pendent ultraviolet absorbing group is a triazine. In some embodiments, the pendent ultraviolet absorbing group has enhanced spectral coverage in the long-wave UV region (e.g., 315 nm to 400 nm), enabling it to block the high wavelength UV light that can cause yellowing in polymers. The first divalent unit can be considered to be a repeating unit in the ultraviolet absorbing oligomer.

In some of embodiments of the compositions or method according to the present disclosure, the first divalent unit may be represented by formula -[—CH$_2$—C(H)UVA-]-, -[—CH$_2$—C(H)C(O)—O—X-UVA-]-, -[—CH$_2$—C(H)C(O)—NH—X-UVA-]-, -[—CH$_2$—C(CH$_3$)C(O)—O—X-UVA-]-, or -[—CH$_2$—C(CH$_3$)C(O)—NH—X-UVA-]-, wherein X is a bond or an alkylene or alkyleneoxy group having from 1 to 10 (in some embodiments, 2 to 6 or 2 to 4) carbon atoms and optionally interrupted by one or more —O— groups and optionally substituted by a hydroxyl group, and wherein UVA includes any of the above embodiments of UVA groups. In the alkyleneoxy group, the oxygen is attached to the UVA group. The oligomer may include (e.g., at least 2, 3, 4, 5, 6, 7, 8, 9, 10, 15, or at least 20 up to 30, 35, 40, 45, 50, 100, 200, or up to 500 or more) of these repeating units, independently selected. The repeating unit can be derived from a substituted vinyl, substituted acrylate, or substituted methacrylate group. In some of these embodiments, each first divalent unit is independently represented by formula:

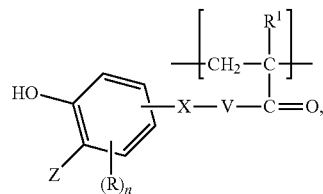

wherein R$^1$ is hydrogen or methyl, V is O or NH, X is a bond or X is alkylene or alkyleneoxy group having from 1 to 10 (in some embodiments, 2 to 6 or 2 to 4) carbon atoms and optionally interrupted by one or more —O— groups and optionally substituted by a hydroxyl group, R is alkyl (e.g., having from one to four carbon atoms), n is 0 or 1, and Z is a benzoyl group, a 4,6-bisphenyl[1,3,5]triazin-2-yl group, or a 2H-benzotriazol-2-yl group, wherein the benzoyl group, 4,6-bisphenyl[1,3,5]triazin-2yl group, and 2H-benzotriazol2-yl group is optionally substituted by one or more alkyl, aryl, alkoxy, hydroxyl, or halogen substituents, or a combination of these substituents. In some embodiments, the alkyl and/or alkoxy substituent independently has 1 to 4 or 1 to 2 carbon atoms. In some embodiments, each halogen substituent is independently a chloro, bromo, or iodo group. In some embodiments, each halogen substituent is a chloro group. The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl. In the alkyleneoxy group, the oxygen is attached to the substituted benzene ring. In some embodiments, each V is O, and X is ethylene, propylene, butylene, ethyleneoxy, propyleneoxy, or butyleneoxy, with the oxygen attached to the substituted benzene ring. In some embodiments, each V is O, and X is ethyleneoxy, propyleneoxy, or butyleneoxy, with the oxygen attached to the substituted benzene ring. In some embodiments, n is 0. In some embodiments, R is methyl, ethyl, n-propyl, isopropyl, n-butyl, isobutyl, s-butyl, or t-butyl, and n is 1. In some embodiments, Z is an unsubstituted benzoyl group. In some embodiments, Z is 4,6-bis(2,4-dimethylphenyl)[1,3,5]triazin-2-yl; 4,6-bis(2,4-diethylphenyl)[1,3,5]triazin-2-yl; 4,6-bis(2,4-dimethoxyphenyl)[1,3,5]triazin-2-yl; or 4,6-bis(2,4-diethoxyphenyl)[1,3,5]triazin-2-yl. In some embodiments, Z is 2H-benzotriazol-2-yl or 5-chloro-2H-benzotriazol-2-yl. In some embodiments, Z is 4,6-bisphenyl[1,3,5]triazin-2-yl.

In embodiments of the compositions and method disclosed herein in which the ultraviolet light-absorbing group is a triazine, at least some of the first divalent units may be represented by formula:

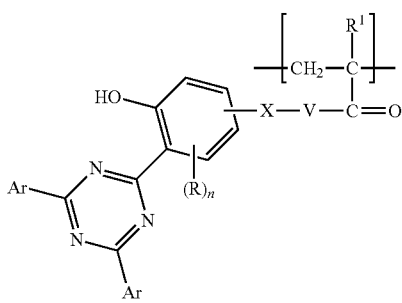

wherein R, $R^1$, X, and V are as described above in any of their embodiments, and wherein each Ar is a phenyl group optionally substituted by one or more alkyl, aryl, alkoxy, hydroxyl, or halogen substituents, or a combination of these substituents. In some embodiments, the alkyl and/or alkoxy substituent independently has 1 to 4 or 1 to 2 carbon atoms. In some embodiments, each halogen substituent is independently a chloro, bromo, or iodo group. In some embodiments, each halogen substituent is a chloro group. The aryl substituent is as defined above. In some embodiments, Ar is 2,4-dimethylphenyl; 2,4-diethylphenyl; 2,4-dimethoxyphenyl; or 2,4-diethoxyphenyl.

In embodiments of the compositions and method disclosed herein in which the ultraviolet light-absorbing group is a triazine, at least some of the first divalent units may be represented by formula:

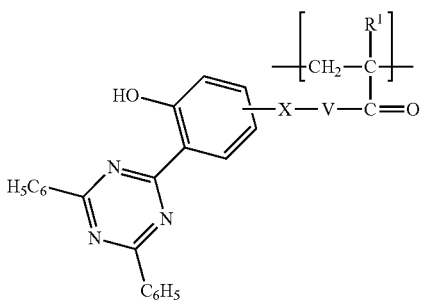

wherein $R^1$, X, and V are as described above in any of their embodiments.

Ultraviolet light-absorbing oligomers useful in the compositions according to the present disclosure and/or prepared according to the method of the present disclosure comprise at least one (e.g., at least 2, 3, 4, 5, 6, 7, 8, 9, 10, 15, or at least 20 up to 30, 35, 40, 45, 50, 100, 200, 500, 1000, or up to 1500 or more) second divalent unit independently represented by formula:

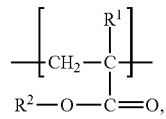

wherein each $R^1$ is independently hydrogen or methyl (in some embodiments, hydrogen, in some embodiments, methyl), and wherein each $R^2$ is independently alkyl having from 1 to 4 carbon atoms (in some embodiments, methyl, ethyl, n-propyl, isopropyl, n-butyl, iso-butyl, or tert-butyl). In some embodiments, each $R^2$ is independently methyl or ethyl. In some embodiments, each $R^2$ is methyl. In some embodiments, both $R^1$ and $R^2$ are methyl.

In some embodiments, ultraviolet light-absorbing oligomers useful in the compositions according to the present disclosure and/or prepared according to the method of the present disclosure comprise at least one (e.g., at least 2, 3, 4, 5, 6, 7, 8, 9, 10, 15, or at least 20 up to 30, 35, 40, 45, 50, 100, 200, 500, or up to 1000 or more) third divalent unit independently represented by formula:

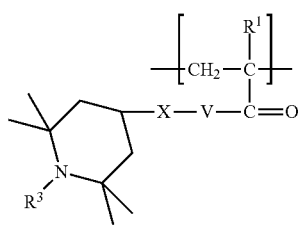

wherein each $R^1$ is independently hydrogen or methyl (in some embodiments, hydrogen, in some embodiments, methyl), V is O or NH, X is a bond or X is alkylene or alkyleneoxy group having from 1 to 10 (in some embodiments, 2 to 6 or 2 to 4) carbon atoms and optionally interrupted by one or more —O— groups and optionally substituted by a hydroxyl group, and $R^3$ is hydrogen, alkyl, oxy, alkoxy (that is, —O— alkyl with the oxygen atom attached to the nitrogen atom), or alkanone (that is, —C(O)-alkyl with the carbonyl group attached to the nitrogen atom). In some embodiments, $R^3$ is hydrogen or alkyl. In some embodiments, X is a bond. In some embodiments, X is an alkyleneoxy group. In the alkyleneoxy group, the oxygen is attached to the substituted piperidine ring. In some embodiments, each V is O and X is ethylene, propylene, butylene, ethyleneoxy, propyleneoxy, or butyleneoxy, with the oxygen attached to the substituted piperidine ring. It should be understood that when X is a bond, then the third divalent unit can be represented by formula:

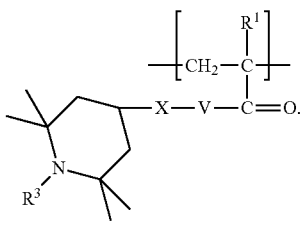

In some embodiments, particularly in some of the Examples, below, the third divalent unit or the second oligomer are referred as the HALS group.

In some embodiments, the first divalent unit and the third divalent unit need not be in the same oligomer. In these embodiments, the composition includes the ultraviolet light-absorbing oligomer as described in any of the embodiments above, which may or may not include a third divalent unit, and a second oligomer. The second oligomer includes at least one (e.g., at least 2, 3, 4, 5, 6, 7, 8, 9, 10, 15, or at least 20 up 30, 35, 40, 45, 50, 100, 200, 500 or up to 1000 or more) of the third divalent units and at least one (e.g., at least 2, 3, 4, 5, 6, 7, 8, 9, 10, 15, or at least 20 up 30, 35, 40, 45, 50, 100, 200, 500, 1000, or up to 1500 or more) of the second divalent units but not necessarily a first divalent unit. The second divalent unit and the third divalent unit can be as described as above for any of their embodiments.

In some embodiments, ultraviolet light-absorbing oligomers and/or second oligomers useful in the compositions according to the present disclosure and/or made according to the method of the present disclosure in any of the embodiments described above include (e.g., at least 1, 2, 3, 4, 5, 6, 7, 8, 9, 10, 15, or at least 20 up to 30, 35, 40, 45, 50, 100, 200, or up to 500 or more) fourth divalent units independently represented by formula:

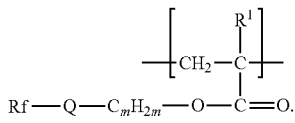

For divalent units having this formula, each $R^1$ is independently hydrogen or methyl (in some embodiments, hydrogen, in some embodiments, methyl). Q is a bond, —SO$_2$N(R)—, or —C(O)—N(R)— wherein R is alkyl having 1 to 4 carbon atoms (e.g., methyl, ethyl, n-propyl, isopropyl, n-butyl, or isobutyl) or hydrogen. In some embodiments, Q is a bond. In some embodiments, Q is —SO$_2$N(R)—. In some of these embodiments, R is methyl or ethyl. m is an integer from 1 to 11 (i.e., 1, 2, 3, 4, 5, 6, 7, 8, 9, 10, or 11). In some of these embodiments, m is 1; in other of these embodiments, m is 2. In some embodiments wherein Q is —SO$_2$N(R)—, m is an integer from 2 to 11, 2 to 6, or 2 to 4. In some embodiments wherein Q is a bond, m is an integer from 1 to 6, 1 to 4, or 1 to 2. In embodiments wherein Q is a bond, it should be understood that the fourth divalent units may also be represented by formula:

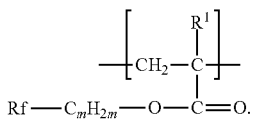

In some embodiments, oligomers disclosed herein, including any of the embodiments described above in connection to the first divalent units, comprise (e.g., at least 2, 3, 4, 5, 6, 7, 8, 9, 10, 15, or at least 20 up 30, 35, 40, 45, 50, 100, or up to 200) fourth divalent units independently represented by formula:

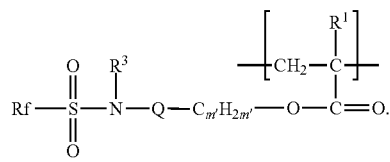

For divalent units of this formula, m' is an integer from 2 to 11 (i.e., 2, 3, 4, 5, 6, 7, 8, 9, 10, or 11). In some embodiments, m' is an integer from 2 to 6 or 2 to 4. $R^3$ is alkyl having 1 to 4 carbon atoms (e.g., methyl, ethyl, n-propyl, isopropyl, n-butyl, or isobutyl) or hydrogen. In some embodiments, $R^3$ is methyl or ethyl. $R^1$ is independently hydrogen or methyl (in some embodiments, hydrogen, in some embodiments, methyl).

For any of the embodiments of the fourth divalent units, each Rf independently represents a fluorinated alkyl group having from 1 to 6 (in some embodiments, 2 to 6 or 2 to 4) carbon atoms (e.g., trifluoromethyl, perfluoroethyl, 1,1,2,2-tetrafluoroethyl, 2-chlorotetrafluoroethyl, perfluoro-n-propyl, perfluoroisopropyl, perfluoro-n-butyl, 1,1,2,3,3,3-hexafluoropropyl, perfluoroisobutyl, perfluoro-sec-butyl, or perfluoro-tert-butyl, perfluoro-n-pentyl, pefluoroisopentyl, or perfluorohexyl). In some embodiments, Rf is perfluorobutyl (e.g., perfluoro-n-butyl, perfluoroisobutyl, or perfluoro-sec-butyl). In some embodiments, Rf is perfluoropropyl (e.g., perfluoro-n-propyl or perfluoroisopropyl). The oligomer may include a mixture of fluorinated monomers having different Rf fluoroalkyl groups (e.g., with an average of up to 6 or 4 carbon atoms).

In some embodiments, in oligomers disclosed herein, including any of the embodiments described above in connection to the first divalent units, Rf is a polyfluoroether group. The term "polyfluoroether" refers to a compound or group having at least 3 (in some embodiments, at least 4, 5, 6, 7, 8, 9, 10, 11, 12, 13, 14, 15, 16, 17, 18, 19, or even 20) carbon atoms and at least 1 (in some embodiments, at least 2, 3, 4, 5, 6, 7, or even 8) ether linkages, wherein hydrogen atoms on the carbon atoms are replaced with fluorine atoms. In some embodiments, Rf has up to 100, 110, 120, 130, 140, 150, or even 160 carbon atoms and up to 25, 30, 35, 40, 45, 50, 55, or even 60 ether linkages.

In some embodiments, including embodiments wherein Rf is a polyfluoroether group, oligomers disclosed herein comprise (e.g., at least 2, 3, 4, 5, 6, 7, 8, 9, 10, 15, or at least 20 up 30, 35, 40, 45, 50, 100, 200, or up to 500 or more) fourth divalent units independently represented by formula:

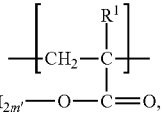

For divalent units of this formula, m' is an integer from 2 to 11 (i.e., 2, 3, 4, 5, 6, 7, 8, 9, 10, or 11). In some embodiments, m' is an integer from 2 to 6 or 2 to 4. $R^4$ is alkyl having 1 to 4 carbon atoms (e.g., methyl, ethyl, n-propyl, isopropyl, n-butyl, or isobutyl) or hydrogen. In some embodiments, $R^4$ is methyl or ethyl. In some embodiments, $R^4$ is hydrogen. $R^1$ is independently hydrogen or methyl (in some embodiments, hydrogen, in some embodiments, methyl)

The polyfluoroether group Rf can be linear, branched, cyclic, or combinations thereof and can be saturated or unsaturated. Polyfluoroether groups include those in which hydrogen or chlorine atoms are present instead of fluorine atoms with typically up to one atom of either hydrogen or chlorine is present for every two carbon atoms. The oligomer may include a mixture of fluorinated monomers having different Rf polyfluoroether groups. In some embodiments, the polyfluoroether group is a perfluoropolyether group (i.e., all of the hydrogen atoms on the carbon atoms are replaced with fluorine atoms). Exemplary perfluoropolyethers include perfluorinated repeating units represented by at least one of $—(C_dF_{2d})—$, $—(C_dF_{2d}O)—$, $—(CF(L'))—$, $—(CF(L')O)—$, $—(CF(L')C_dF_{2d}O)—$, $—(C_dF_{2d}CF(L')O)—$, or $—(CF_2CF(L')O)—$. In these repeating units, d is typically an integer from 1 to 10. In some embodiments, d is an integer from 1 to 8, 1 to 6, 1 to 4, or 1 to 3. The L' group can be a perfluoroalkyl group optionally interrupted by at least one ether linkage or a perfluoroalkoxy group, each of which may be linear, branched, cyclic, or a combination thereof. The L' group typically has up to 12 (in some embodiments, up to 10, 8, 6, 4, 3, 2, or 1) carbon atoms. In some embodiments, the L' group can have up to 4 (in some embodiments, up to 3, 2, or 1) oxygen atoms; in some embodiments L' has no oxygen atoms. In these perfluoropolyether structures, different repeating units can be combined in a block or random arrangement to form the Rf group.

In some embodiments, Rf is represented by formula $R_f^a—O—(R_f^b—O—)_z(R_f^c)—$, wherein $R_f^a$ is a perfluoroalkyl having 1 to 10 (in some embodiments, 1 to 6, 1 to 4, 2 to 4, or 3) carbon atoms; each $R_f^b$ is independently a perfluoroalkylene having 1 to 4 (i.e., 1, 2, 3, or 4) carbon atoms; $R_f^c$ is a perfluoroalkylene having 1 to 6 (in some embodiments, 1 to 4 or 2 to 4) carbon atoms; and z' is in a range from 2 to 50 (in some embodiments, 2 to 25, 2 to 20, 3 to 20, 3 to 15, 5 to 15, 6 to 10, or 6 to 8). Representative $R_f^a$ groups include $CF_3—$, $CF_3CF_2—$, $CF_3CF_2CF_2—$, $CF_3CF(CF_3)—$, $CF_3CF(CF_3)CF_2—$, $CF_3CF_2CF_2CF_2—$, $CF_3CF_2CF(CF_3)—$, $CF_3CF_2CF(CF_3)CF_2—$, and $CF_3CF(CF_3)CF_2CF_2—$. In some embodiments, $R_f^a$ is $CF_3CF_2CF_2—$. Representative $R_f^b$ groups include $—CF_2—$, $—CF(CF_3)—$, $—CF_2CF_2—$, $—CF(CF_3)CF_2—$, $—CF_2CF_2CF_2—$, $—CF(CF_3)CF_2CF_2—$, $—CF_2CF_2CF_2CF_2—$, and $—CF_2C(CF_3)_2—$. Representative $R_f^c$ groups include $—CF_2—$, $—CF(CF_3)—$, $—CF_2CF_2—$, $—CF_2CF_2CF_2—$, and $—CF(CF_3)CF_2—$. In some embodiments, $R_f^c$ is $—CF(CF_3)—$.

In some embodiments, $(R_f^b—O—)_z$ is represented by $—[CF_2O]_i[CF_2CF_2O]_j—$, $—[CF_2O]_i[CF(CF_3)CF_2O]_j—$, $—[CF_2O]_i[CF_2CF_2CF_2O]_j—$, $—[CF_2CF_2O]_i[CF_2O]_j—$, $—[CF_2CF_2O]_i[CF(CF_3)CF_2O]_j—$, $—[CF_2CF_2O]_i[CF_2CF_2CF_2O]_j—$, $—[CF_2CF_2CF_2O]_i[CF_2CF(CF_3)O]_j—$, and $[CF_2CF_2CF_2O]_i[CF(CF_3)CF_2O]_j—$, wherein i+j is an integer of at least 3 (in some embodiments, at least 4, 5, or 6).

In some embodiments, Rf is selected from the group consisting of $C_3F_7O(CF(CF_3)CF_2O)_kCF(CF_3)—$, $C_3F_7O(CF_2CF_2CF_2O)_kCF_2CF_2—$, or $CF_3O(C_2F_4O)_gCF_2—$, wherein k has an average value in a range from 3 to 50 (in some embodiments, 3 to 25, 3 to 15, 3 to 10, 4 to 10, or 4 to 7), and wherein g has an average value in a range from 6 to 50 (in some embodiments, 6 to 25, 6 to 15, 6 to 10, 7 to 10, or 8 to 10). In some of these embodiments, Rf is $C_3F_7O(CF(CF_3)CF_2O)_kCF(CF_3)—$, wherein k has an average value in a range from 4 to 7. In some embodiments, Rf is selected from the group consisting of $CF_3O(CF_2O)_{x'}(C_2F_4O)_{y'}CF_2—$ and $F(CF_2)_3—O—(C_4F_8O)_{z'}(CF_2)_3—$, wherein x', y', and z' each independently has an average value in a range from 3 to 50 (in some embodiments, 3 to 25, 3 to 15, 3 to 10, or even 4 to 10).

In some embodiments, Rf is a polyfluoropolyether group that has a weight average molecular weight of at least 750 (in some embodiments at least 850 or even 1000) grams per mole. In some embodiments, Rf has a weight average molecular weight of up to 6000 (in some embodiments, 5000 or even 4000) grams per mole. In some embodiments, Rf has a weight average molecular weight in a range from 750 grams per mole to 5000 grams per mole. Weight average molecular weights can be measured, for example, by gel permeation chromatography (i.e., size exclusion chromatography) using techniques known in the art.

When any of the first, second, third, or fourth divalent units is present, each $R^1$ is independently selected.

Oligomers according to the present disclosure can be prepared, for example, by polymerizing a mixture of components typically in the presence of an initiator. By the term "polymerizing" it is meant forming a polymer or oligomer that includes at least one identifiable structural element due to each of the components. Typically, preparing the ultraviolet light-absorbing oligomer includes combining components comprising at least a first monomer having an ultraviolet light-absorbing group, a second monomer, and optionally at least one of a third or fourth monomer, described below. Typically, preparing the second oligomer includes combining components comprising at least a second monomer and a third monomer, and optionally a fourth monomer, described below.

Suitable first monomers for some embodiments of the compositions and methods disclosed herein are those that include benzophenone, benzotriazole, triazine, cinnamate, cyanoacrylate, dicyano ethylene, salicylate, oxanilide, or para-aminobenzoate groups. Examples of suitable first monomers include 2-(cyano-β,β-biphenylacryloyloxy)ethyl-1-methacrylate, 2-(α-cyano-β,β-biphenylacryloyloxy)ethyl-2-methacrylamide, N-(4-methacryloylphenol)-N'-(2-ethylphenyl)oxamide, vinyl 4-ethyl-α-cyano-β-phenylcinnamate, 2-hydroxy-4-(2-hydroxy-3-methacryloyloxypropoxy)benzophenone, 2-hydroxy-4-methacryloyloxybenzophenone, 2-hydroxy-4-(2-acryloyloxyethoxy)benzophenone, 2-hydroxy-4-(4-acryloyloxybutoxy)benzophenone, 2,2'-dihydroxy-4-(2-acryloyloxyethoxy)benzophenone, 2-hydroxy-4-(2-acryloyloxyethoxy)-4'-(2-hydroxyethoxy)benzophenone, 4-(allyloxy)-2-hydroxybenzophenone, 2-(2'-hydroxy-3'-methacrylamidomethyl-5'-octylphenyl)benzotriazole, 2-(2-hydroxy-5-vinylphenyl)-2-benzotriazole, 2-(2H-benzotriazol-2-yl)-4-methyl-6-(2-propenyl)phenol, 2-(2'-hydroxy-5'-methacryloyloxyethylphenyl)-2H-benzotriazole, 2-(2'-hydroxy-5'-methacryloyloxyethylphenyl)-5-chloro-2H-benzotriazole, 2-(2'-hydroxy-5'-methacryloyloxypropylphenyl)-2H-benzotriazole, 2-(2'-hydroxy-5'-methacryloyloxypropylphenyl)-5-chloro-2H-benzotriazole, 2-(2'-hydroxy-3'-tert-butyl-5'-methacryloyloxyethylphenyl)-2H-benzotriazole, 2-(2'-hydroxy-3'-tertbutyl-5'-methacryloyloxyethylphenyl)-5-chloro-2H-benzotriazole, 2,4-diphenyl-6-[2-hydroxy-4-(2-acryloyloxyethoxy)]-1,3,5-triazine, 2,4-bis(2-methylphenyl)-6-[2-hydroxy-4-(2-acryloyloxyethoxy)]-1,3,5-triazine, 2,4-bis(2-methoxyphenyl)-6-[2-hydroxy-4-(2-acryloyloxyethoxy)]-1,3,5-triazine, 2,4-bis(2-ethylphenyl)-6-[2-hydroxy-4-(2-acryloyloxyethoxy)]-1,3,5-triazine, 2,4- bis(2-ethoxyphenyl)-6-[2-hydroxy-4-(2-acryloyloxy-ethoxy)]-1,3,5-triazine, 2,4-diphenyl-6-[2-hydroxy-4-(2-methacryloyloxyethoxy)]-1,3,5-triazine, 2,4-bis(2-methylphenyl)-6-[2-hydroxy-4-(2-methacryloyloxyethoxy)]-1,3,5-triazine, 2,4-bis(2-methoxyphenyl)-6-[2-hydroxy-4-(2-methacryloyloxyethoxy)]-1,3,5-triazine, 2,4-bis(2-ethylphenyl)-6-[2-hydroxy-4-(2-methacryloyloxyethoxy)]-1,3,5-triazine, 2,4-bis(2-ethoxyphenyl)-6-[2-hydroxy-4-(2-methacryloyloxyethoxy)]-1,3,5-triazine, 2,4-bis(2,4-dimethoxyphenyl)-6-[2-hydroxy-4-(2-acryloyloxyethoxy)]-1,3,5-triazine, 2,4-bis(2,4-dimethylphenyl)-6-[2-hydroxy-4-(2-acryloyloxyethoxy)]-1,3,5-triazine, 2,4-bis(2,4-diethoxyphenyl)-6-[2-hydroxy-4-(2-acryloyloxyethoxy)]-1,3,5-triazine, 2,4-bis (2,4-diethylphenyl)-6-[2-hydroxy-4-(2-acryloyloxyethoxy)]-1,3,5-triazine, methacrylates of the foregoing acrylates and acrylates of the foregoing methacrylates. Combinations of these first monomers may be used to prepare the oligomer. In some embodiments, the first monomer includes a triazine, a benzophenone, or a benzotriazole group. In these embodiments, the first monomer can be any of the monomers including a triazine, benzophenone, or benzotriazole group listed above. In some embodiments of the composition according to the present disclosure, the first monomer includes a triazine group. In these embodiments, the first monomer can be any of the monomers including a triazine group listed above.

Many of these first monomers can be obtained commercially from a variety of chemical suppliers. Others can be prepared by treating a UVA having an available hydroxyl group (e.g., other than a phenolic hydroxyl group ortho to a triazine, benzoyl, or benzotriazole group) with (meth)acrylic acid or an equivalent thereof using conventional esterification methods. The term (meth)acrylic refers to both acrylic and methacrylic. In the case of a UVA having an available phenol group (e.g., other than a phenolic hydroxyl group ortho to a triazine, benzoyl, or benzotriazole group), the phenol group may be treated with ethylene carbonate or ethylene oxide to form a hydroxyethyl group that can then be treated with (meth)acrylic acid or an equivalent thereof using conventional esterification methods.

The components that are useful for preparing the oligomers disclosed herein include a second monomer. In some of these embodiments, the oligomer is prepared by including at least one compound represented by formula $R^2$—O—C(O)—C($R^1$)=CH$_2$ (e.g., methyl methacrylate, ethyl acrylate, propyl acrylate, butyl acrylate) as the second monomer in the components to be polymerized. $R^1$ and $R^2$ are as defined above in any of their embodiments.

The components that are useful for preparing at least one of the ultraviolet light-absorbing oligomer or the second oligomer disclosed herein include a third monomer that includes a 2,2,6,6-tetramethylpiperidinyl group in which the nitrogen atom is substituted by hydrogen, alkyl, alkoxy, or alkanone. Examples of suitable third monomers include 2,2,6,6,-tetramethyl-4-piperidyl methacrylate, 1,2,2,6,6-pentamethyl-4-piperidyl methacrylate, 4-methacryloylamino-2,2,6,6-tetramethylpiperidine, 4-methacryloylamino-1,2,2,6,6-pentamethylpiperidine, 2,2,6,6,-tetramethyl-1-oxy-4-piperidyl methacrylate, 4-methacryloylamino-2,2,6,6-tetramethyl-1-oxypiperidine, 2,2,6,6,-tetramethyl-4-piperidyl acrylate, 1,2,2,6,6-pentamethyl-4-piperidyl acrylate, 4-acryloylamino-2,2,6,6-tetramethylpiperidine, 4-acryloylamino-1,2,2,6,6-pentamethylpiperidine, 2,2,6,6,-tetramethyl-1-oxy-4-piperidyl acrylate, and 4-acryloylamino-2,2,6,6-tetramethyl-1-oxypiperidine.

Many of these first monomers can be obtained commercially from a variety of chemical suppliers. Others can be prepared by treating a 2,2,6,6-tetramethylpiperidine having an available hydroxyl group with (meth)acrylic acid or an equivalent thereof using conventional esterification methods. The term (meth)acrylic refers to both acrylic and methacrylic. For example, the hydroxyl group may be treated with (meth)acrylic acid or an equivalent thereof using conventional esterification methods.

The components that are useful for preparing at least one of the ultraviolet light-absorbing oligomers or the second oligomers disclosed herein can include a fourth monomer, typically a fluorinated free-radically polymerizable monomer independently represented by formula Rf-Q-($C_mH_{2m}$)—O—C(O)—C($R^1$)=CH$_2$, Rf—SO$_2$—N($R^3$)—($C_mH_{2m'}$)—O—C(O)—C($R^1$)=CH$_2$, or Rf—CO—N($R^4$)—($C_mH_{2m'}$)—O—C(O)—C($R^1$)=CH$_2$, wherein Rf, $R^3$, $R^4$, $R^1$, m, and m' are as defined above.

Some compounds of Formula Rf-Q-($C_mH_{2m}$)—O—C(O)—C($R^1$)=CH$_2$, are available, for example, from commercial sources (e.g., 3,3,4,4,5,5,6,6,6-nonafluorohexyl acrylate from Daikin Chemical Sales, Osaka, Japan; 3,3,4,4,5,5,6,6,6-nonafluorohexyl 2-methylacrylate from Indofine Chemical Co., Hillsborough, N.J.; 1H,1H,2H,2H-perfluorooctylacrylate from ABCR, Karlsruhe, Germany; and 2,2,3,3,4,4,5,5-octafluoropentyl acrylate and methacrylate and 3,3,4,4,5,6,6,6-octafluoro-5-(trifluoromethyl)hexyl methacrylate from Sigma-Aldrich, St. Louis, Mo.). Others can be made by known methods (see, e.g., EP1311637 B1, published Apr. 5, 2006, for the preparation of 2,2,3,3,4,4,4-heptafluorobutyl 2-methylacrylate). Compounds wherein Q is —SO$_2$N(R)— can be made according to methods described in, e.g., U.S. Pat. No. 2,803,615 (Albrecht et al.) and U.S. Pat. No. 6,664,354 (Savu et al.), the disclosures of which, relating to free-radically polymerizable monomers and methods of their preparation, are incorporated herein by reference. A perfluoropolyether monomer of formula Rf—(CO)NHCH$_2$CH$_2$O(CO)C($R^1$)=CH$_2$ can be prepared by first reacting Rf—C(O)—OCH$_3$, for example, with ethanolamine to prepare alcohol-terminated Rf—(CO)NHCH$_2$CH$_2$OH, which can then be reacted with (meth)acrylic acid, (meth)acrylic anhydride, or (meth)acryloyl chloride to prepare the compound of Formula Rf—(CO)NHCH$_2$CH$_2$O(CO)C($R^1$)=CH$_2$, wherein $R^1$ is methyl or hydrogen, respectively. Other amino alcohols (e.g., amino alcohols of formula NRHXOH) can be used in this reaction sequence. In further examples, an ester of formula Rf—C(O)—OCH$_3$ or a carboxylic acid of formula Rf—C(O)—OH can be reduced using conventional methods (e.g., hydride, for example sodium borohydride, reduction) to an alcohol of formula Rf—CH$_2$OH. The alcohol of formula Rf—CH$_2$OH can then be reacted with methacryloyl chloride, for example, to provide a perfluoropolyether monomer of formula Rf—CH$_2$O(CO)C($R^1$)=CH$_2$. Examples of suitable reactions and reagents are further disclosed, for example, in the European patent EP 870 778 A1, published Oct. 14, 1998, and U.S. Pat. No. 3,553,179 (Bartlett et al.).

In some embodiments, the oligomer useful in the compositions and methods according to the present disclosure is represented by formula:

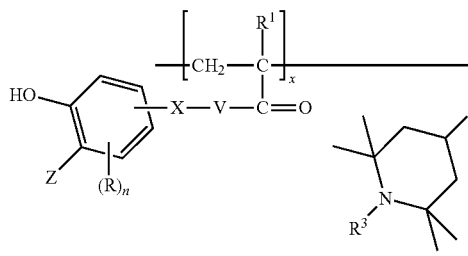

In this formula, Z, R, n, X, V, R$^1$, R$^2$, R$^3$, Rf, Q, and m are as defined above in any of their embodiments, w is in a range from 0 to 1000 or more, x and y are in a range from 0 to 500 or more, z is in a range from 1 to 1500 or more, or x, w, y, and z can be any of the ranges described above. When w is 0, the composition according to the present disclosure includes a second oligomer, which, in some embodiments, is represented by formula:

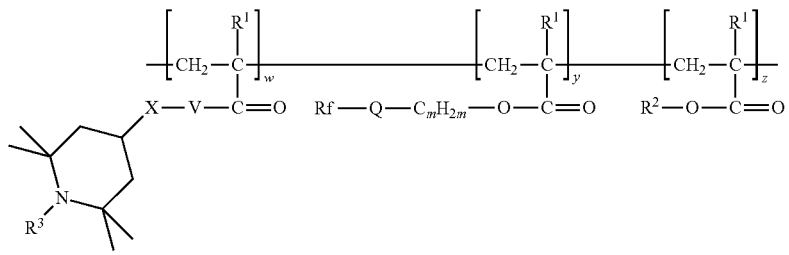

In this formula, X, V, R$^1$, R$^2$, R$^3$, Rf, Q, and m are as defined above in any of their embodiments, w is in a range from 1 to 1000 or more, z is in a range from 1 to 1500 or more, and y is in a range from 0 to 500 or more, or w, y, and z can be any of the ranges described above. It should be understood that the representation of the order of the divalent units in these formulas is for convenience only and not meant to specify that the oligomers are block copolymers. Random copolymers having first and second or third and second divalent units are also included in the representations.

The polymerization reaction for making the oligomers useful in the compositions according to the present disclosure can be carried out in the presence of an added free-radical initiator. Free radical initiators such as those widely known and used in the art may be used to initiate polymerization of the components. Examples of suitable free-radical initiators include azo compounds (e.g., 2,2'-azobisisobutyronitrile (AIBN), 2,2'-azobis(2-methylbutyronitrile), or azo-2-cyanovaleric acid), hydroperoxides (e.g., cumene, tert-butyl or tert-amyl hydroperoxide), dialkyl peroxides (e.g., di-tert-butyl or dicumylperoxide), peroxyesters (e.g., tert-butyl perbenzoate or di-tert-butyl peroxyphthalate), and diacylperoxides (e.g., benzoyl peroxide or lauryl peroxide).

The free-radical initiator may also be a photoinitiator. Examples of useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); 1-hydroxycyclohexyl phenyl ketone; and acylphosphine oxide derivatives and acylphosphonate derivatives (e.g., bis(2,4,6-trimethylbenzoyl)phenylphosphine oxide, diphenyl-2,4,6-trimethylbenzoylphosphine oxide, isopropoxyphenyl-2,4,6-trimethylbenzoylphosphine oxide, or dimethyl pivaloylphosphonate). Many photoinitiators are available, for examples, from BASF, Florham Park, N.J., under the trade designation "IRGACURE". The photoinitiator may be selected so that the wavelength of light required to initiate polymerization is not absorbed by the ultraviolet absorbing group.

In some embodiments, the polymerization reaction is carried out in solvent. The components may be present in the reaction medium at any suitable concentration, (e.g., from about 5 percent to about 80 percent by weight based on the total weight of the reaction mixture). Illustrative examples of suitable solvents include aliphatic and alicyclic hydrocarbons (e.g., hexane, heptane, cyclohexane), aromatic solvents (e.g., benzene, toluene, xylene), ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), halogenated solvents (e.g., methylchloroform, 1,1,2-trichloro-1,2,2-trifluoroethane, trichloroethylene, trifluorotoluene, and hydrofluoroethers available, for example, from 3M Company, St. Paul, Minn. under the trade designations "HFE-7100" and "HFE-7200"), and mixtures thereof.

Polymerization can be carried out at any temperature suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or from about 50° C. to about 80° C.).

Free-radical polymerizations may be carried out in the presence of chain transfer agents. Typical chain transfer agents that may be used in the preparation compositions according to the present invention include hydroxyl-substituted mercaptans (e.g., 2-mercaptoethanol, 3-mercapto-2- butanol, 3-mercapto-2-propanol, 3-mercapto-1-propanol, and 3-mercapto-1,2-propanediol (i.e., thioglycerol)); poly (ethylene glycol)-substituted mercaptans; carboxy-substituted mercaptans (e.g., mercaptopropionic acid or mercaptoacetic acid); amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan).

Adjusting, for example, the concentration and activity of the initiator, the concentration of each of the reactive monomers, the temperature, the concentration of the chain transfer agent, and the solvent using techniques known in the art can control the molecular weight of the oligomer.

The weight ratio of the first divalent units, second divalent units, and third divalent units in the oligomers disclosed herein in any of their embodiments may vary. For example, the first divalent units may be present in the ultraviolet light-absorbing oligomer in a range from 5 to 50 (in some embodiments, 10 to 40 or 10 to 30) percent, based on the total weight of the oligomer. The second divalent units may be present in a range from 5 to 95 percent, based on the total weight of the oligomer. In some embodiments, the second divalent unit is present in the oligomer in an amount of up to 90, 80, 75, or 70 percent by weight, based on the total weight of the oligomer. Third divalent units may be present in a range from 2 to 25, 2 to 20, or 5 to 15 percent by weight, based on the total weight of the oligomer. Or there may be no third divalent units in the ultraviolet light-absorbing oligomer. In some embodiments, the oligomer comprises at least one (e.g., at least 2, 3, 4, 5, 6, 7, 8, 9, 10, 15, or at least 20 up to 30, 35, 40, 45, 50, 100, 200, 500, 1000, or up to 1500 or more) second divalent units and at least one (e.g., at least 2, 3, 4, 5, 6, 7, 8, 9, 10, 15, or at least 20 up to 30, 35, 40, 45, 50, 100, 200, or up to 500 or more) first divalent units.

In some embodiments, including embodiments in which the ultraviolet light-absorbing oligomer does not include the third divalent unit, the composition further comprises a second oligomer comprising a third divalent unit comprising a pendent 2,2,6,6-tetramethylpiperidinyl group at least one of the second divalent units. The third divalent units may be present in the second oligomer in a range from 5 to 50 (in some embodiments, 10 to 40 or 10 to 30) percent, based on the total weight of the second oligomer. The second divalent units may be present in a range from 5 to 95 percent, based on the total weight of the second oligomer. In some embodiments, the second divalent unit is present in the second oligomer in an amount of up to 90, 80, 75, or 70 percent by weight, based on the total weight of the second oligomer.

When the fourth divalent unit is present in the ultraviolet light-absorbing oligomer or in the second oligomer, it may be present in a range from 5 to 90, 10 to 90, 20 to 90, or 10 to 50 percent by weight, based on the total weight of the oligomer. When the fourth divalent unit is present in the ultraviolet light-absorbing oligomer or in the second oligomer in an amount of at least 50, 60, 75, or 80 percent, it may be useful to use the oligomer in combination with another oligomer having a lower weight percentage of fourth divalent units.

Compositions according to the present disclosure include a fluoropolymer, an ultraviolet-light absorbing oligomer, and optionally a second oligomer according to any of the aforementioned embodiments. The fluoropolymer is typically a fluorinated thermoplastic obtained by polymerizing one or more types of fully fluorinated or partially fluorinated monomers (e.g., tetrafluoroethylene, vinyl fluoride, vinylidene fluoride, hexafluoropropylene, pentafluoropropylene, trifluoroethylene, trifluorochloroethylene, and combinations of these in any useful ratio.) Fluoropolymers useful for practicing the present disclosure typically have at least some degree of crystallinity. In some embodiments, fluoropolymers useful for practicing the present disclosure have weight average molecular weights in a range from 30,000 grams per mole to 1,000,000 grams per mole. In some embodiments, the weight average molecular weight is at least 40,000 or 50,000 grams per mole up to 500,000, 600,000, 700,000, 800,000, or up to 900,000 grams per mole. Useful fluoropolymers include ethylene-tetrafluoroethylene copolymers (ETFE), tetrafluoroethylene-hexafluoropropylene copolymers (FEP), tetrafluoroethylene-hexafluoropropylene-vinylidene fluoride copolymers (THV), polyvinylidene fluoride (PVDF), blends thereof, and blends of these and other fluoropolymers. Another useful fluoropolymer is a PDVF and hexafluoropropylene (HFP) blend in a variety of useful ratios (e.g., in a range from 50:50 to 95:5 PVDF:HFP, such as 90:10). In some embodiments, the compositions according to the present disclosure include the fluoropolymer in an amount of at least 50, 60, 70, 80, 85, 90, 95, or 96 percent by weight based on the total weight of the composition. In some embodiments, the compositions according to the present disclosure include the fluoropolymer in an amount greater than 95 percent by weight, based on the total weight of the composition. In some embodiments, the compositions according to the present disclosure include the fluoropolymer in an amount of up to 99.5, 99, or 98 percent by weight based on the total weight of the composition.

The composition comprising the fluoropolymer and the oligomer described above can also include non-fluorinated materials. For example, the composition can include poly (methyl methacrylate) (PMMA) polymer or a copolymer of methyl methacrylate and a $C_2$-$C_8$ alkyl acrylate or methacrylate. The PMMA polymer or copolymer can have a weight average molecular weight of at least 50,000 grams per mole, 75,000 grams per mole, 100,000 grams per mole, 120,000 grams per mole, 125,000 grams per mole, 150,000 grams per mole, 165,000 grams per mole, or 180,000 grams per mole. The PMMA polymer or copolymer may have a weight average molecular weight of up to 1,000,000 grams per mole, in some embodiments, 500,000 grams per mole, in some embodiments, up to 400,000 grams per mole, and in some embodiments, up to 250,000 grams per mole. In some embodiments, a blend of polyvinylidene fluoride and poly (methyl methacrylate) can be useful.

In some embodiments, oligomers disclosed herein can be useful in films including a blend of PVDF and PMMA. In these embodiments, it is typically useful for the PMMA to be present in the blend in a range from 10% to 25%, in some embodiments, 15% to 25% or 10% to 20% by weight, based on the total weight of PVDF and PMMA. Films that include much higher amounts of PMMA (e.g., greater than 50% by weight, based on the total weight of PVDF and PMMA) typically have poorer photodurability, higher flammability, and poorer flexibility than films that include PVDF blended with 10% to 25% by weight PMMA. As shown in Examples 15 to 17 of Int. Pat. Appl. Pub. No. WO2014/100580 (Olson et al.), when ultraviolet light-absorbing oligomers disclosed herein are used in a film blend of PVDF and PMMA in which the PMMA to be present in the film blend in a range from 10% to 25% by weight, the retention of the ultraviolet light-absorbing oligomers disclosed herein after exposure to ultraviolet light was surprisingly superior to a PVDF film including the oligomers but not including PMMA. Accordingly, the present disclosure provides a composition that includes a blend of a polyvinylidene fluoride and poly (methyl methacrylate) and an ultraviolet light-absorbing oligomer and optionally a second oligomer. When it is said that the poly(methyl methacrylate) is present in the blend in a range from 10% to 25% by weight, based on the total weight of polyvinylidene fluoride and poly(methyl methacrylate). The percentage of poly(methyl methacrylate) in the blend is relative only to the polyvinylidene fluoride and poly(methyl methacrylate), and does not reflect the presence of oligomer. Even when an ultraviolet light-absorbing oligomer disclosed herein includes a second divalent unit derived from methyl methacrylate, the oligomer does not contribute to the percentage of poly(methyl methacrylate).

It can be useful to have a mixture of different ultraviolet light-absorbing oligomers in the compositions according to the present disclosure. In some embodiments, the composition comprises at least two different ultraviolet light-absorbing oligomers in the blend, each ultraviolet light-absorbing oligomer independently comprising the first divalent unit, the second divalent unit, and optionally the third or fourth divalent unit. Each ultraviolet light-absorbing oligomer may independently comprise a triazine, a benzophenone, or a benzotriazole. It may be useful for two different ultraviolet light-absorbing oligomers to have two different types of pendent ultraviolet absorbing group. In some embodiments, the first divalent units in the ultraviolet light-absorbing oligomer and in the second, different ultraviolet light-absorbing comprise different Z groups, as defined above. In any of these embodiments, the second, different ultraviolet-light absorbing oligomer can comprise at least one (e.g., at least 2, 3, 4, 5, 6, 7, 8, 9, 10, 15, or at least 20 up to 30, 35, 40, 45, 50, 100, 200, 500, 1000, or up to 1500) independently selected second divalent unit, at least one (e.g., at least 2, 3, 4, 5, 6, 7, 8, 9, 10, 15, or at least 20 up to 30, 35, 40, 45, 50, 100, 200, or up to 500) independent selected first divalent unit, and optionally at least one (e.g., at least 2, 3, 4, 5, 6, 7, 8, 9, 10, 15, or at least 20 up to 30, 35, 40, 45, 50, 100, 200, 500, or up to 1000) independently selected third divalent unit. The first, second, and third divalent units may be as described in any of the embodiments described above for the ultraviolet light-absorbing oligomer. The mixture of two different ultraviolet-light absorbing oligomers may be useful to improve compatibility in some cases. For example, as shown in Int. Pat. Appl. Pub. No. WO2014/100580 (Olson et al.), if an oligomer including a high weight percentage of fourth divalent units results in some non-uniformity in color, haze, or continuity in a film made from the composition, including a second oligomer having a majority of second divalent units in the composition can unexpectedly provide a film having uniform color, haze, and caliper.

The composition according to the present disclosure typically includes a blend of the fluoropolymer, the oligomer or oligomers, and any non-fluorinated polymers. By "blend" it is meant that the fluoropolymer and the oligomer according to the present disclosure are not located in separate, distinguishable domains. In other words, the oligomer is typically dispersed throughout the composition; it is not isolated as if in a core-shell polymer particle. Also, by "blend" it should be understood that the fluoropolymer and the ultraviolet light-absorbing oligomer(s) are distinct components. The components of the blend are generally not covalently bonded to each other. Ultraviolet light-absorbing monomers grafted onto a fluoropolymer do not constitute a blend of the fluoropolymer and the oligomer(s) as disclosed herein. In many embodiments, the components of the composition are surprisingly compatible, and the composition appears homogeneous when the components are blended together.

The advantageous compatibility of the oligomer according to the present disclosure and the fluoropolymer in the compositions disclosed herein allows the compositions to be compounded without organic solvent. For example, the oligomer and the fluoropolymer can be melt-processed, compounded, mixed, or milled on conventional equipment. Conveniently, uniform masterbatch compositions can be made that include the ultraviolet light-absorbing oligomer at relatively high concentrations in the fluoropolymer. The masterbatch compositions can be extruded (e.g., in a single- or twin-screw extruder) and formed into films. After extrusion, the compositions can also be pelletized or granulated. The masterbatch compositions can then be extrusion compounded with additional fluoropolymer or non-fluorinated polymer (e.g., PMMA) and formed into films.

Other stabilizers may be added to the compositions according to the present disclosure to improve resistance to UV light. Examples of these include anti-oxidants and conventional HALS (not acrylic oligomers as described herein). Exemplary anti-oxidants include those obtained under the trade designations "IRGAFOS 126", "IRGANOX 1010" and "ULTRANOX 626", available from BASF, Florham Park, N.J. Some suitable conventional HALS include a tetramethylpiperidine group, in which the nitrogen atoms on the piperidine may be unsubstituted or substituted by alkyl or acyl. Suitable HALS include decanedioic acid, bis (2,2,6,6-tetramethyl-1-(octyloxy)-4-piperidinyl)ester, bis(2, 2,6,6-tetramethyl-4-piperidyl)sebacate, 8-acetyl-3-dodecyl-7,7,9,9-tetramethyl-1,3,8-triazaspiro(4,5)-decane-2,5-dione, bis(2,2,6,6-tetramethyl-4-hydroxypiperidine succinate), N,N'-bisformyl-N,N'-bis-(2,2,6,6-tetramethyl-4-piperidinyl) hexamethylenediamine, and bis(N-methyl-2,2,6,6-tetramethyl-4-piperidyl)secacate. Suitable HALS include those available, for example, from BASF under the trade designations "CHIMASSORB". These stabilizers, if present, can be included in the compositions according to the present disclosure in any effective amount, typically up to 5, 2, to 1 percent by weight based on the total weight of the composition and typically at least 0.1, 0.2, or 0.3 percent by weight. Calcite may also be a useful additive in some compositions, for example, to protect against corrosion of processing equipment not made of corrosion resistant steel.

In some embodiments of the composition according to the present disclosure, the composition can be included in one or more layers of a multilayer film. The multilayer film is any film having more than one layer, typically in the thickness direction of the film. For example, the multilayer film may have at least two or three layers up to 10, 15, or 20 layers. In some embodiments, the composition may be included in a mirror film, which may have a layer (or layers) of the composition according to the present disclosure and a metal layer. In some embodiments, the composition can be included in a multilayer optical film (that is, having an optical layer stack), for example, such as those described in U.S. Pat. App. Pub. Nos. 2009/0283144 (Hebrink et al.) and 2012/0011850 (Hebrink et al.). Multi-layer optical films may have, for example, at least 100, 250, 500, or even at least 1000 optical layers. Such multi-layer optical films can be useful as ultraviolet light-reflective mirrors, visible light-reflective mirrors, infrared light-reflective mirrors, or any combination of these (e.g., broadband reflective mirrors). In some of these embodiments, the multilayer optical film reflects at least a major portion of the average light across the range of wavelengths that corresponds with the absorption bandwidth of a selected photovoltaic cell and does not reflect a major portion of the light that is outside the absorption bandwidth of the photovoltaic cell. In other embodiments, the multilayer optical film may be combined with a metal layer to provide a broadband reflector. In some embodiments, the composition according to the present disclosure may be useful, for example, as a retroreflective sheet.

In view of the advantageous compatibility of the ultraviolet light-absorbing oligomer and the fluoropolymer in the compositions disclosed herein, the present disclosure provides a method of making a composition and a method of making a film. The method of making a composition includes blending the ultraviolet light-absorbing oligomer and optionally the second oligomer with a fluoropolymer to make the composition. The method of making a film includes providing a composition according to the present disclosure, which includes a blend of at least the fluoropolymer, the ultraviolet light-absorbing oligomer, and optionally the second oligomer and extruding the composition into a film. The method may also include blending the composition with additional fluoropolymer or non-fluorinated polymer (e.g., if the composition is a masterbatch composition) before extruding the composition into a film. In some embodiments, the ultraviolet light-absorbing oligomer includes the third divalent unit. In these embodiments, the second oligomer may or may not be present. In some embodiments, the ultraviolet light-absorbing oligomer does not include the third divalent unit. In these embodiments, the second oligomer is present.

In some embodiments of the composition or methods of making the composition or the film, the composition is essentially free of volatile organic solvent. Volatile organic solvents are typically those have a boiling point of up to 150° C. at atmospheric pressure. Examples of these include esters, ketones, and toluene. "Essentially free of volatile organic solvent" can mean that volatile organic solvent may be present (e.g., from a previous synthetic step or in a commercially available monomer) in an amount of up to 2.5 (in some embodiments, up to 2, 1, 0.5, 0.1, 0.05, or 0.01) percent by weight, based on the total weight of the composition. Advantageously, compositions disclosed herein and their films can be made without the expensive manufacturing step of removing organic solvent.

The compositions according to the present disclosure can include the ultraviolet light-absorbing oligomer and optionally the second oligomer in a range of useful amounts. For example, the ultraviolet light-absorbing oligomer may be present in the composition at up to about 25 percent by weight, based on the total weight of the composition. In some embodiments, the second oligomer including the 2,2,6,6-tetramethylpiperidine group is present in the composition in an amount of up to 25, 20, 15, or ten percent by weight, based on the total weight of the composition. When two or more different ultraviolet light-absorbing oligomers are present, the two or more are present in the composition in an amount up to 25 percent combined weight, based on the total weight of the composition. Useful amounts of the ultraviolet light-absorbing oligomer(s) and second oligomer may be in a range from 1 to 25, 2 to 20, 3 to 15, or 4 to 10 percent by weight, based on the total weight of the composition. As shown in the Examples, below, compositions with ultraviolet light-absorbing oligomers in this range are quite effective at absorbing ultraviolet light, and the ultraviolet light protection is maintained even after weathering or exposure to heat and humidity. This is unexpected in view of JP2001/19895, published, Jan. 23, 2001, which suggests that polymeric ultraviolet light absorbers are most useful in compositions at 30 to 60 parts per hundred. Useful amounts of the ultraviolet absorbing group and tetramethylpiperidinyl group may be in a range from 0.5 to 15, 0.5 to 10, 1.5 to 7.5, or 2 to 5 percent by weight, based on the total weight of the composition.

The advantageous compatibility of the ultraviolet light-absorbing oligomer and the fluoropolymer in the compositions disclosed herein, which allows the compositions to be extrusion compounded, for example, is not found in many compositions including UVAs and fluoropolymers. For example, while a compound represented by formula

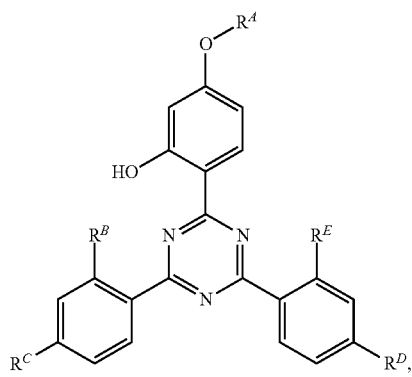

wherein $R^A$ is $C_{1-20}$ alkyl or aryl and $R^B$, $R^C$, $R^D$, and $R^E$ are hydrogen, $C_{1-5}$ alkyl, hydroxyl, or aryl are said to be useful UVAs in polymer blends (see, e.g., JP2001/001478, published, Jan. 9, 2001), Comparative Example 2, below, shows that when a triazine UV absorber obtained from BASF, Florham Park, N.J., under the trade designation "TINUVIN 1600" was mixed with PVDF it did not provide UV protection after exposure to weathering as evidenced by increased transmission in a range from 300 nm to 380 nm after weathering. Also, when a triazine UV absorber obtained from BASF under the trade designation "TINUVIN 1600" was extrusion compounded with PVDF, the resulting strands were very hazy and difficult to pelletize.

Furthermore, while incorporating acryloyl or methacryloyl functional 2-hydroxybenzophenones or 2-hydroxyphenyl-2H-benzotriazoles into high molecular weight PMMA has been proposed, low weathering resistance was observed in comparison to non-covalently attached UVAs (see, U.S. Pat. Appl. Pub. No. 2010/0189983 (Numrich et al.). In contrast the oligomers according to the present disclosure have excellent resistance to weathering, as demonstrated by high retention of percent transmission of visible light and low transmission of ultraviolet light after weathering according to the method described in the Examples, below.

While the retention of the ultraviolet light-absorbing oligomers disclosed herein after exposure to ultraviolet light is generally much superior to the retention of conventional ultraviolet light absorbers after exposure to the same conditions, when the ultraviolet light-absorbing oligomer further includes the third divalent unit having the pendent 2,2,6,6-tetramethylpiperidinyl group and/or when the composition includes the second oligomer including the second and third divalent units, the retention of the ultraviolet-light absorbing oligomers after exposure to ultraviolet light generally is remarkably even better.

In some embodiments, compositions according to the present disclosure are transmissive to both visible and infrared light. The term "transmissive to visible and infrared light" as used herein can mean having an average transmission over the visible and infrared portion of the spectrum of at least about 75% (in some embodiments at least about 80, 85, or 90, 92, 95, 97, or 98%) measured along the normal axis. In some embodiments, the composition has an average transmission over a range of 400 nm to 1400 nm of at least about 75% (in some embodiments at least about 80, 85, 90, 92, 95, 97, or 98%) measured along the normal axis.

Compositions according to the present disclosure may be useful for a variety of outdoor applications. For example, the compositions according to the present disclosure may be useful, for example, for top layers of traffic or other signs, other graphic films, anti-grafitti films, automotive exteriors, roofing materials or other architectural films, or window films.

Compositions according to the present disclosure are useful, for example, for encapsulating solar devices. In some embodiments, the composition (e.g., in any embodiment in the form of a film) is disposed on, above, or around a photovoltaic cell. Accordingly, the present disclosure provides a photovoltaic device including the composition disclosed herein in which the composition (e.g., in the form of a film) is used as a top sheet for the photovoltaic device. Photovoltaic devices include photovoltaic cells that have been developed with a variety of materials each having a unique absorption spectrum that converts solar energy into electricity. Each type of semiconductor material has a characteristic band gap energy which causes it to absorb light most efficiently at certain wavelengths of light, or more precisely, to absorb electromagnetic radiation over a portion of the solar spectrum. The compositions according to the present disclosure typically do not interfere with absorption of visible and infrared light, for example, by photovoltaic cells. In some embodiments, the composition has an average transmission over a range wavelengths of light that are useful to a photovoltaic cell of at least about 75% (in some embodiments at least about 80, 85, 90, 92, 95, 97, or 98%). Examples of materials used to make solar cells and their solar light absorption band-edge wavelengths include: crystalline silicon single junction (about 400 nm to about 1150 nm), amorphous silicon single junction (about 300 nm to about 720 nm), ribbon silicon (about 350 nm to about 1150 nm), CIS (Copper Indium Selenide) (about 400 nm to about 1300 nm), CIGS (Copper Indium Gallium di-Selenide) (about 350 nm to about 1100 nm), CdTe (about 400 nm to about 895 nm), GaAs multi-junction (about 350 nm to about 1750 nm). The shorter wavelength left absorption band edge of these semiconductor materials is typically between 300 nm and 400 nm. Organic photovoltaic cells may also be useful. One skilled in the art understands that new materials are being developed for more efficient solar cells having their own unique longer wavelength absorption band-edge. In some embodiments, the photovoltaic device including the composition according to the present disclosure includes a CIGS cell. In some embodiments, the photovoltaic device to which the assembly is applied comprises a flexible film substrate.

A composition according to the present disclosure (e.g., in the form of a film) can be used as a substrate for a barrier stack (see, e.g., U.S. Pat. Appl. Pub. No. 2012/0227809 (Bharti et al.) or can be attached to a barrier stack using an optically clear adhesive such as a pressure sensitive adhesive (PSA) (see, e.g., U.S. Pat. Appl. Pub. No. 2012/0003451 (Weigel et al.). Examples of PSAs include acrylates, silicones, polyisobutylenes, ureas, and combinations thereof. Some useful commercially available PSAs include UV curable PSAs such as those available from Adhesive Research, Inc., Glen Rock, Pa., under the trade designations "ARclear 90453" and "ARclear 90537" and acrylic optically clear PSAs available, for example, from 3M Company, St. Paul, Minn., under the trade designations "OPTICALLY CLEAR LAMINATING ADHESIVE 8171", "OPTICALLY CLEAR LAMINATING ADHESIVE 8172", and "OPTICALLY CLEAR LAMINATING ADHESIVE 8172P". In some embodiments, the top sheet and barrier film assembly is attached to the photovoltaic cell with an encapsulant. Although other encapsulants may be useful, in some embodiments, the encapsulant is ethylene vinylacetate.

Some Embodiments of the Disclosure

In a first embodiment, the present disclosure provides a composition comprising a blend of a fluoropolymer and an ultraviolet light-absorbing oligomer, wherein the ultraviolet light-absorbing oligomer comprises:

a first divalent unit comprising a pendent ultraviolet absorbing group; and a second divalent unit represented by formula:

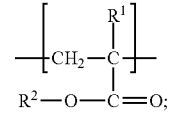

wherein $R^1$ is hydrogen or methyl; and $R^2$ is alkyl having from 1 to 4 carbon atoms, and wherein at least one of the following limitations is met:

the ultraviolet light-absorbing oligomer further comprises a third divalent unit comprising a pendent 2,2,6,6-tetramethylpiperidinyl group;

the composition further comprises a second oligomer comprising a third divalent unit comprising a pendent 2,2,6,6-tetramethylpiperidinyl group at least one of the second divalent units, wherein the nitrogen of the pendent 2,2,6,6-tetramethylpiperidinyl group is substituted by hydrogen, alkyl, alkoxy, or alkanone; or the composition further comprises a hindered amine light stabilizer.

In a second embodiment, the present disclosure provides the composition of the first embodiment, wherein the pendent ultraviolet absorbing group comprises a triazine, a benzophenone, or a benzotriazole.

In a third embodiment, the present disclosure provides the composition of the first or second embodiment, wherein the first divalent unit is represented by formula:

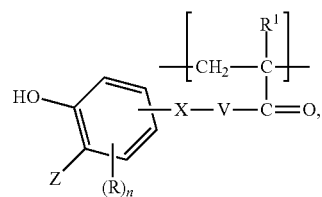

wherein $R^1$ is independently hydrogen or methyl;

V is O or NH;

X is a bond, alkylene, or alkyleneoxy, wherein the alkylene or alkyleneoxy have from 1 to 10 carbon atoms and are optionally interrupted by one or more —O— groups and optionally substituted by a hydroxyl group;

R is alkyl having from one to four carbon atoms;
n is 0 or 1; and
Z is a benzoyl group optionally substituted by hydroxyl, alkyl, halogen, or hydroxyl; a 4,6-bisphenyl[1,3,5]triazin-2-yl group wherein each phenyl is optionally independently substituted by one or more alkyl or alkoxy groups; or a 2H-benzotriazol-2-yl group optionally substituted by one or more halogens.

In a fourth embodiment, the present disclosure provides the composition of any one of the first to third embodiments, wherein the third divalent unit is represented by formula:

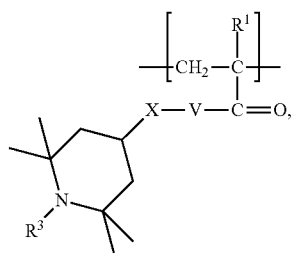

wherein
$R^1$ is independently hydrogen or methyl;
X is a bond, alkylene, or alkyleneoxy, wherein the alkylene or alkyleneoxy have from 1 to 10 carbon atoms and are optionally interrupted by one or more —O— groups and optionally substituted by a hydroxyl group;
V is O or NH; and
$R^3$ is hydrogen, alkyl, oxy, alkoxy, or alkanone.

In a fifth embodiment, the present disclosure provides the composition the fourth embodiment, wherein X is a bond.

In a sixth embodiment, the present disclosure provides the composition of any one of the first to fifth embodiments, wherein at least one of the ultraviolet light-absorbing oligomer or the second oligomer further comprises a fourth divalent unit represented by formula:

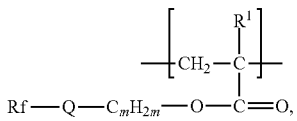

wherein
Rf represents a fluoroalkyl group having from 1 to 8 carbon atoms optionally interrupted by one —O— group, or Rf represents a polyfluoropolyether group;
$R^1$ is independently hydrogen or methyl;
Q is a bond, —SO$_2$—N(R$^5$)—, or —C(O)—N(R$^5$)—, wherein R is alkyl having from 1 to 4 carbon atoms or hydrogen; and
m is an integer from 0 to 10.

In a seventh embodiment, the present disclosure provides the composition any one of the first to sixth embodiments, wherein the ultraviolet light-absorbing oligomer comprises the third divalent unit.

In an eighth embodiment, the present disclosure provides the composition of any one of the first to seventh embodiments, wherein the composition comprises the second oligomer.

In a ninth embodiment, the present disclosure provides the composition of the eighth embodiment, wherein the second oligomer is present in the composition in an amount of up to ten percent by weight, based on the total weight of the composition. In these embodiments, the 2,2,6,6-tetramethylpiperidinyl group may be present in the composition in an amount of up to 5 percent by weight, based on the total weight of the composition.

In a tenth embodiment, the present disclosure provides the composition of the eighth or ninth embodiment, wherein the second oligomer has a number average molecular weight of up to 150,000 grams per mole and wherein $R^1$ and $R^2$ are both methyl.

In an eleventh embodiment, the present disclosure provides the composition of any one of the first to tenth embodiments, wherein the ultraviolet light-absorbing oligomer is in the composition in an amount ranging from 1 percent to 25 percent by weight, based on the total weight of the composition.

In a twelfth embodiment, the present disclosure the composition of any one of the first to tenth embodiments, wherein the ultraviolet absorbing group is in the composition in an amount ranging from 0.5 weight percent to 5 weight percent, based on the total weight of the composition.

In a thirteenth embodiment, the present disclosure provides the composition of any one of the first to twelfth embodiment, wherein the fluoropolymer is present in the blend in an amount of at least 70 percent by weight, based on the total weight of the composition.

In a fourteenth embodiment, the present disclosure provides the composition of any one of the first to thirteenth embodiments, wherein the blend further comprises poly(methyl methacrylate).

In a fifteenth embodiment, the present disclosure provides the composition of any one of the first to fourteenth embodiments, wherein poly(methyl methacrylate) is present in the composition in an amount from ten percent to 25 percent by weight, based on the total weight of the polyvinylidene fluoride and poly(methyl methacrylate).

In a sixteenth embodiment, the present disclosure provides the composition of the fourteenth or fifteenth embodiment, wherein the poly(methyl methacrylate) has a number average molecular weight of at least 100,000 grams per mole.

In a seventeenth embodiment, the present disclosure provides the composition of any one of the first to sixteenth embodiments, wherein the fluoropolymer is present in the blend in an amount of at least 90 percent by weight, based on the total weight of the composition.

In an eighteenth embodiment, the present disclosure provides the composition of any one of the first to seventeenth embodiments, wherein in the second divalent unit, $R^1$ and $R^2$ are both methyl.

In a nineteenth embodiment, the present disclosure provides the composition of any one of the first to eighteenth embodiments, wherein the composition comprises a second, different ultraviolet light-absorbing oligomer in the blend, wherein the second ultraviolet light-absorbing oligomer comprises a divalent unit comprising a second pendent ultraviolet absorbing group, the second divalent unit, and optionally the third divalent unit, wherein the second pendent ultraviolet absorbing group comprises a triazine, a benzophenone, or a benzotriazole. In these embodiments, the first divalent units in the ultraviolet light-absorbing oligomer and in the second, different ultraviolet light-absorbing oligomer may comprise different ultraviolet absorbing groups.

In a twentieth embodiment, the present disclosure provides the composition of the nineteenth embodiment, wherein the ultraviolet light-absorbing oligomer and the second, different ultraviolet light-absorbing oligomer are present in the composition in an amount of up to 25 percent by weight, based on the total weight of the composition.

In a twenty-first embodiment, the present disclosure provides the composition of any one of the first to twentieth embodiments, wherein the composition is in the form of a film.

In a twenty-second embodiment, the present disclosure provides the composition of the twenty-first embodiment, wherein the composition is an extruded film.

In a twenty-third embodiment, the present disclosure provides the composition of any one of the first to twenty-second embodiments, wherein the composition is essentially free of volatile organic solvent.

In a twenty-fourth embodiment, the present disclosure provides the composition of any one of the first to twenty-third embodiments, wherein the ultraviolet light-absorbing oligomer has a number average molecular weight of less than 150,000 grams per mole and wherein $R^1$ and $R^2$ are both methyl.

In a twenty-fifth embodiment, the present disclosure provides the composition of any one of the first to twenty-fourth embodiments, wherein the fluoropolymer is selected from the group consisting of ethylene-tetrafluoroethylene copolymer, a tetrafluoroethylene-hexafluoropropylene copolymer, a tetrafluoroethylene-hexafluoropropylene-vinylidene fluoride copolymer, or polyvinylidene fluoride.

In a twenty-sixth embodiment, the present disclosure provides the composition of any one of the first to twenty-fifth embodiments, wherein the film is a multilayer film.

In a twenty-seventh embodiment, the present disclosure provides the composition of the twenty-sixth embodiment, wherein the film is a multilayer optical film.

In a twenty-eighth embodiment, the present disclosure provides the composition of any one of the first to twenty-seventh embodiments, wherein the pendent ultraviolet absorbing group comprises a triazine.

In a twenty-ninth embodiment, the present disclosure provides the composition of the twenty-eighth embodiment, wherein the first divalent unit is represented by formula:

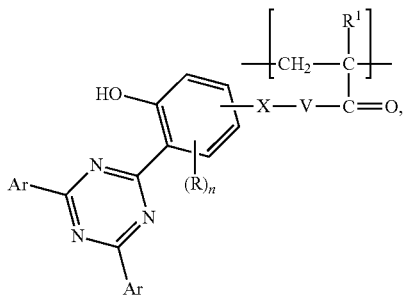

wherein
$R^1$ is independently hydrogen or methyl;
V is O or NH;
X is alkylene or alkyleneoxy group having from 1 to 10 carbon atoms and optionally interrupted by one or more —O— groups and optionally substituted by a hydroxyl group;
R is alkyl having from one to four carbon atoms;
n is 0 or 1; and
Ar is a phenyl group that is unsubstituted or substituted by one or more alkyl, aryl, alkoxy, hydroxyl, or halogen substituents, or a combination of these substituents.

In a thirtieth embodiment, the present disclosure provides the composition of the twenty-ninth embodiment, wherein Ar is phenyl.

In a thirty-first embodiment, the present disclosure provides a photovoltaic device comprising the composition of any one of the first to thirtieth embodiments.

In a thirty-second embodiment, the present disclosure provides a graphic film comprising the composition of any one of the first to thirtieth embodiments.

In a thirty-third embodiment, the present disclosure provides an architectural film comprising the composition of any one of the first to thirtieth embodiments.

In a thirty-fourth embodiment, the present disclosure provides a window film comprising the composition of any one of the first to thirtieth embodiments.

In a thirty-fifth embodiment, the present disclosure provides a vehicle wrap comprising the composition of any one of the first to thirtieth embodiments.

In a thirty-sixth embodiment, the present disclosure provides a method of making the composition of any one of the first to thirtieth embodiments, the method comprising:
combining the fluoropolymer, the ultraviolet light-absorbing oligomer, and optionally the second oligomer to form the blend; and
extruding the blend into a film.

Embodiments of the compositions and methods disclosed herein are further illustrated by the following examples, but the particular materials and amounts thereof recited in these examples, as well as other conditions and details, should not be construed to unduly limit this invention.

EXAMPLES

Molecular Weight Determination

In the following oligomer examples, the molecular weight was determined by comparison to linear polystyrene polymer standards using gel permeation chromatography (GPC). The GPC measurements were carried out on a Waters Alliance 2695 system (obtained from Waters Corporation, Milford, Mass.) using four 300 millimeter (mm) by 7.8 mm linear columns of 5 micrometer styrene divinylbenzene copolymer particles (obtained from Polymer Laboratories, Shropshire, UK, under the trade designation "PLGEL") with pore sizes of 10,000, 1000, 500, and 100 angstroms. A refractive index detector from Waters Corporation (model 410) was used at 40° C. A 50-milligram (mg) sample of oligomer in ethyl acetate was diluted with 10 milliliters (mL) of tetrahydrofuran (inhibited with 250 ppm of BHT) and filtered through a 0.45 micrometer syringe filter. A sample volume of 100 microliters was injected onto the column, and the column temperature was 40° C. A flow rate of 1 mL/minute was used, and the mobile phase was tetrahydrofuran. Molecular weight calibration was performed using narrow dispersity polystyrene standards with peak average molecular weights ranging from $3.8 \times 10^5$ grams per mole to 580 grams per mole. Calibration and molecular weight distribution calculations were performed using suitable GPC software using a third order polynomial fit for the molecular weight calibration curve. Each reported result is an average of duplicate injections.

Glass Transition Temperature

For the following oligomer examples, the glass transition temperatures were measured by Differential Scanning calorimetry (DSC) using Q2000 Differential Scanning calorimeter obtained from TA Instruments, New Castle, Del. Glass transition temperature was determined using Modulated DSC with a modulation amplitude of ±1° C. per minute and a ramp rate of 3° C. per minute.

Accelerated Ultraviolet Light Exposure

Films were exposed in a weathering device according to a high-irradiance version of ASTM G155 Cycle 1 run at slightly higher temperature. Radiation from the xenon arc source was appropriately filtered so as to provide an excellent match to the ultraviolet portion of the solar spectrum. Samples were tested prior to any exposure to these accelerated weathering conditions, and then removed at total UV dosage intervals of about 373 MJ/m$^2$ for evaluation. The number of these dosage intervals to which the Examples were exposed are specified below.

Preparative Example 1

2-{4-[4,6-Bis-(2,4-dimethyl-phenyl)-[1,3,5]triazin-2-yl]-3-hydroxy-phenoxy}-ethyl acrylate ester

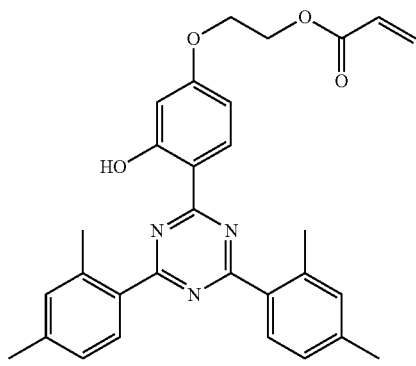 [SMILES: C=CC(=O)OCCOc1ccc(-c2nc(-c3ccc(C)cc3C)nc(-c3ccc(C)cc3C)n2)c(O)c1]

Part A

A three liter 3-neck round bottom flask was equipped with a temperature probe, condenser and mechanical stirrer. The flask was charged with 500 grams (1.26 moles) of 2,4-di-(2,4-dimethylphenyl)-6-(2,4-dihydroxyphenyl)-triazine, 124 grams (1.4 moles) of ethylene carbonate, 18 grams (0.085 moles) tetraethylammonium bromide and 475 grams of dimethyl formamide. The batch was heated to 150° C. and maintained at that temperature for five hours. The evolution of CO$_2$ from the batch was observed. After five hours, 15 grams additional ethylene carbonate and 2 grams additional tetraethylammonium bromide were added. The batch was heated at 150° C. for three hours, and then 15 grams additional ethylene carbonate and 2 grams additional tetraethylammonium bromide were added. The batch was heated at 150° C. for three more hours, after which time no more starting material was observed by thin layer chromatography.

The batch was allowed to cool to 80° C., and 1360 grams of isopropanol (IPA) was added with good agitation. The mixture was cooled to room temperature, and the solid product was collected by filtration onto a Buchner funnel. The solid product was taken up into 1000 grams each of water and IPA, stirred well, and collected by filtration onto a Buchner funnel. The product was air-dried to give 540 grams (96%) of an off-white solid product, 2-[4,6-bis-(2,4-dimethylphenyl)-[1,3,5]triazin-2-yl]-5-(2-hydroxyethoxy)phenol, mp=172° C.-173° C. The product was used without further purification.

Part B

A two liter 3-neck round bottom flask was equipped with a temperature probe, Dean-Stark trap with condenser, and mechanical stirrer. The flask was charged with 170 grams (0.385 moles) of 2-[4,6-bis-(2,4-dimethylphenyl)-[1,3,5]triazin-2-yl]-5-(2-hydroxyethoxy)phenol, prepared in Part A, 780 grams of toluene, 0.24 grams of 4-methoxyphenol (MEHQ) inhibitor, 0.38 grams of phenothiazine inhibitor, 8.5 grams of p-toluene sulfonic acid, and 30.5 grams (0.42 moles) of acrylic acid. The batch was heated with medium agitation at reflux (about 115° C.) for six hours, and the azeotroped water can collected in the Dean-Stark trap. After five hours, five grams additional acrylic acid was added, and the batch was heated for three more hours. Analysis by thin layer chromatography showed the batch had no residual starting material.

The batch was allowed to cool to 80° C., and a pre-mix of 25 grams sodium carbonate in 300 grams water was added. The reaction mixture was cooled to about 10° C. with an ice bath, and the precipitated product was collected by filtration on a Buchner funnel. The solid was taken back up in a mixture of 800 grams water and 200 grams IPA, and the mixture was stirred well and filtered. The product was air-dried to give 182 grams (96%) of the off-white solid product, 2-{4-[4,6-bis-(2,4-dimethyl-phenyl)-[1,3,5]triazin-2-yl]-3-hydroxyphenoxy}ethyl acrylate ester, mp=126° C.-128° C.

Preparative Example 2

2-(4-Benzoyl-3-hydroxyphenoxy)ethyl acrylate ester

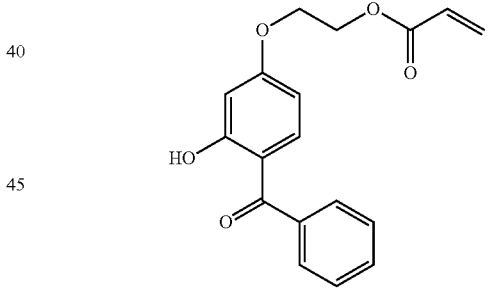

Part A

A five liter 3-neck round bottom flask was equipped with a temperature probe, condenser, and mechanical stirrer. The flask was charged with 500 grams (2.33 moles) of 2,4-dihydroxybenzophenone, 216 grams (2.45 moles) of ethylene carbonate, and 25 grams (0.12 moles) tetraethylammonium bromide. The batch was heated to 140° C. and maintained at that temperature for twenty-four hours. The evolution of CO$_2$ from the batch was observed. Analysis by thin layer chromatography showed the batch had no residual starting material.

The batch was allowed to cool to 80° C., and 1200 grams of isopropanol was added with good agitation. The batch temperature was held at about 60° C., and 2500 grams of water was added while maintaining the batch temperature at about 60° C. The batch was cooled to room temperature with slow agitation, and the product was collected by filtration onto a Buchner funnel. The solid product was taken back up into 1000 grams of water and 200 grams of IPA, stirred well, and collected by filtration onto a Buchner funnel. The product was air-dried to give 545 grams (90%) of an off-white solid product, 2-hydroxy-4-(2-hydroxyethyl)benzophenone, mp=88° C.-89° C. The product was used without further purification.

Part B

A two liter 3-neck round bottom flask was equipped with a temperature probe, Dean-Stark trap with condenser, and mechanical stirrer. The flask was charged with 200 grams (0.77 moles) of 2-hydroxy-4-(2-hydroxyethyl)benzophenone, prepared in Part A, 850 grams toluene, 0.48 grams MEHQ inhibitor, 0.77 grams phenothiazine inhibitor, 17 grams p-toluene sulfonic acid, and 61.4 grams (0.85 moles) of acrylic acid. The batch was heated with medium agitation at reflux (about 115° C.) for six hours, and the azeotroped water was collected in the Dean-Stark trap. After five hours, five grams additional acrylic acid was added, and the batch was heated for three more hours. Analysis by thin layer chromatography showed the batch had no residual starting material.

The batch was cooled to 80° C., and a pre-mix of 25 grams sodium carbonate in 300 grams water was added. The batch was phase split, and the lower aqueous layer was removed. The organic layer was washed with a mixture of 25 grams sodium chloride in 300 grams water. The solvent was stripped using a rotary evaporator. The residual brown oil product was taken up in 230 grams of IPA, and heated to about 60° C. to make a solution. The mixture was agitated gently and cooled to −10° C. to crystallize the off-white solid product. The product was air-dried to give 217 grams (90%) of the off-white solid product, 2-(4-benzoyl-3-hydroxyphenoxy)ethyl acrylate ester, mp=126° C.-128° C.

Preparative Oligomer Example 1

Random Copolymer of 80% by Weight Methyl Methacrylate and 20% Preparative Example 1

Preparative Oligomer Example 1 was prepared by the general method described in U.S. Pat. No. 5,986,011 (Ellis). In a first step of the polymerization, a stainless steel reactor was charged with a mixture of 64 grams of methyl methacrylate (obtained from Rohm and Haas, Philadelphia, Pa.), 16 grams of Preparative Example 1, 4.0 g ethyl acetate, 0.08 grams of an antioxidant obtained from BASF, Florham Park, N.J., under the trade designation "IRGANOX 1010", 2.4 grams of chain transfer agent isooctyl thioglycolate (IOTG), 0.34 grams of MEHQ, and 0.024 grams of 2,2'-azobis(2,4 dimethylpentanenitrile) obtained from E.I. du Pont de Nemours and Company, Wilmington, Del., under the trade designation "VAZO 52". The reactor was sealed, purged of oxygen with nitrogen, and then held at approximately 100 psig nitrogen pressure. The reaction mixture was heated in a first step to 60° C. and then allowed to polymerize adiabatically, peaking at 113° C. When the reaction was complete, the mixture was cooled to below 50° C.

A solution of various initiators dissolved in 18.64 grams ethyl acetate (0.80 grams of 2,2'-azobis(2,4 dimethylpentanenitrile) obtained from E.I. du Pont de Nemours and Company under the trade designation "VAZO 52", 0.20 grams of 2,2'-azobis(2-methylbutanenitrile) obtained from E.I. du Pont de Nemours and Company under the trade designation "VAZO 67", 0.20 grams of 2,2'-azobis(cyclohexanecarbonitrile) obtained from E.I. du Pont de Nemours and Company under the trade designation "VAZO 88", 0.20 grams of 2,5-dimethyl-2,5 di-(t-butylperoxy)hexane obtained from Elf Atochem, Philadelphia, Pa., under the trade designation "LUPERSOL 101", and 0.16 grams of 2,5-dimethyl-2,5-di-(t-butylperoxy)hexyne-3 obtained from Elf Atochem under the trade designation "LUPERSOL 130") and 1.13 grams of IOTG was then added to the product of the first step. The reactor was sealed and purged of oxygen with nitrogen, and then held at 100 psig nitrogen pressure. The reaction mixture was heated to 60° C. and then allowed to polymerize adiabatically. After the reaction reached peak temperature of 144° C., the mixture was held at 145° C. for 1 hour and drained, while hot, into aluminum trays. After the material cooled, the resulting solid polymer was hammered into flakes. The molecular weight of the oligomer was determined by GPC (THF, EMD Omnisolve, 2c PL-Gel-2 300×7.5 mm, polystyrene standard): Mw=108, 700, Mn=54,980, and a polydispersity of 1.99.

Preparative Oligomer Example 2

Random Copolymer of 80% by Weight Methyl Methacrylate and 20% 2-[2-Hydroxy-5-[2-(methacryloyloxy)-ethyl]phenyl]-2H-benzotriazole 2-[2-Hydroxy-5-[2-(methacryloyloxy)-ethyl]phenyl]-2H-benzotriazole was obtained from TCI America, Portland, Oreg. Preparative Oligomer Example 2 was prepared by the general method described in U.S. Pat. No. 5,986,011 (Ellis). In a first step of the polymerization, a stainless steel reactor was charged with a mixture of 64 grams of methyl methacrylate (obtained from Rohm and Haas, Philadelphia, Pa.), 16 grams of 2-[2-Hydroxy-5-[2-(methacryloyloxy)-ethyl]phenyl]-2H-benzotriazole, along with 0.08 grams of an antioxidant obtained from BASF under the trade designation "IRGANOX 1010", 2.4 grams of chain transfer agent IOTG, 0.34 grams of MEHQ, and 0.024 grams of 2,2'-azobis(2,4 dimethylpentanenitrile) obtained from E.I. du Pont de Nemours and Company under the trade designation "VAZO 52". The reactor was sealed, purged of oxygen with nitrogen, and then held at approximately 100 psig nitrogen pressure. The reaction mixture was heated in a first step to 60° C. and then allowed to polymerize adiabatically, peaking at 111° C. When the reaction was complete, the mixture was cooled to below 50° C.

A solution of various initiators dissolved in 18.64 grams ethyl acetate (0.80 grams of azobis(2,4 dimethylpentanenitrile) obtained from E.I. du Pont de Nemours and Company under the trade designation "VAZO 52", 0.20 grams of 2,2'-azobis(2-methylbutanenitrile) obtained from E.I. du Pont de Nemours and Company under the trade designation "VAZO 67", 0.20 grams of 2,2'-azobis(cyclohexanecarbonitrile) obtained from E.I. du Pont de Nemours and Company under the trade designation "VAZO 88", 0.20 grams of 2,5-dimethyl-2,5 di-(t-butylperoxy)hexane obtained from Elf Atochem under the trade designation "LUPERSOL 101", and 0.16 grams of 2,5-dimethyl-2,5-di-(t-butylperoxy)hexyne-3 obtained from Elf Atochem under the trade designation "LUPERSOL 130") and 1.13 grams of IOTG was then added to the product of the first step. The reactor was sealed and purged of oxygen with nitrogen, and then held at 100 psig nitrogen pressure. The reaction mixture was heated to 60° C. and then allowed to polymerize adiabatically. After the reaction reached peak temperature of 150° C., the mixture was warmed to and held at 170° C. for 1 hour and drained, while hot, into aluminum trays. After the material cooled, the resulting solid polymer was hammered into flakes. The molecular weight of the oligomer was determined by GPC (THF, EMD Omnisolve,2c PL-Gel-2 300× 7.5 mm, polystyrene standard): Mw=8,090, Mn=5,824, and a polydispersity of 1.39.

Preparative Oligomer Example 3

Random Copolymer of 70% by Weight Methyl Methacrylate, 20% by weight Preparative Example 1, and 10% by Weight 2,2,6,6-Tetramethyl-4-piperidyl Methacrylate Ten grams of 2,2,6,6-tetramethyl-4 piperidyl methacrylate (obtained from TCI America) was mixed with 20 g of Preparative Example 1, 70 g methyl methacrylate (obtained from Alfa Aesar, Ward Hill, Mass.), 2.8 g of 2,2'-azobis(2-methylbutyronitrile) (obtained from E.I. du Pont de Nemours and Company, Wilmington, Del., under the trade designation "VAZO 67", and 400 g of ethyl acetate in a one-liter flask fitted with a thermocouple, overhead stirrer, and a reflux condenser under positive nitrogen flow. After the addition of materials was completed, the flask was maintained under positive nitrogen pressure. The material was heated at 74° C. for 19 hours. The contents of the flask were poured out and solids were measured. 5.6 g of solution were dried, and 1.25 g of solids were obtained (22% solids). The resin solution was poured into an aluminum tray at dried at room temperature overnight and then in the oven at 110° C. for 4 hours to give 107 g. The crunchy resin was crushed thoroughly and redried in the oven at 100° C. for 2 hours to give 100 g of hard resin. Two glass transition temperatures were observed at 89.62° C. and 99.55° C. using DSC according to the method described above with a scan from −100° C. to 150° C. The molecular weight of the oligomer was determined by GPC (THF, EMD Omnisolve,2c PL-Gel-2 300×7.5 mm, polystyrene standard): Mw=3715, Mn=1834, Mz=4847, and a polydispersity of 2.03.

Preparative Oligomer Example 4

Random Copolymer of 80% by Weight Methyl Methacrylate, 20% by Weight 1,2,2,6,6-Pentamethyl-4-piperidyl Methacrylate Twenty grams of 1,2,2,6,6-pentamethyl-4 piperidyl methacrylate (obtained from TCI America) was mixed with 80 g methyl methacrylate (obtained from Alfa Aesar), 2.8 g of 2,2'-azobis(2-methylbutyronitrile) (obtained from E.I. du Pont de Nemours and Company under the trade designation "VAZO 67", and 404 g of ethyl acetate in a one-liter flask fitted with a thermocouple, overhead stirrer, and a reflux condenser under positive nitrogen flow. After the addition of materials was completed, the flask was maintained under positive nitrogen pressure. The material was heated at 74° C. for 19 hours. The contents of the flask were poured out and solids were measured. 5.6 g of solution were dried, and 1.25 g of solids were obtained (22% solids). The resin solution was poured into an aluminum tray at dried at room temperature for two days and then in the oven at 110° C. for 4 hours to give 107 g. The crunchy resin was crushed thoroughly and redried in the oven at 100° C. for 2 hours to give 102 g of hard resin. One glass transition temperatures was observed at 111.2° C. using DSC according to the method described above with a scan from −100° C. to 150° C. The molecular weight of the oligomer was determined by GPC (THF, EMD Omnisolve,2c PL-Gel-2 300×7.5 mm, polystyrene standard): Mw=4630, Mn=2626, Mz=5560, and a polydispersity of 1.8.

Preparative Oligomer Example 5

Random Copolymer of 80% by Weight Methyl Methacrylate, 20% by Weight 2,2,6,6-Tetramethyl-4-piperidyl Methacrylate Preparative Oligomer Example 5 was prepared by the general method described in U.S. Pat. No. 5,986,011 (Ellis). In a first step of the polymerization, a stainless steel reactor was charged with a mixture of 2328 grams of methyl methacrylate (obtained from Rohm and Haas, Philadelphia, Pa.), 600 grams of 2,2,6,6-tetramethyl-4-piperidyl methacrylate, along with 3.0 grams of an antioxidant obtained from BASF under the trade designation "IRGANOX 1010", 90.0 grams of chain transfer agent IOTG, 0.60 grams of MEHQ, and 0.90 grams of 2,2'-azobis(2,4 dimethylpentanenitrile) obtained from E.I. du Pont de Nemours and Company under the trade designation "VAZO 52". The reactor was sealed, purged of oxygen with nitrogen, and then held at approximately 5 psig nitrogen pressure. The reaction mixture was heated in a first step to 60° C. and then allowed to polymerize adiabatically, peaking at 113° C. When the reaction was complete, the mixture was cooled to below 50° C.

A solution of various initiators dissolved in 23.3 grams ethyl acetate (1.0 grams of azobis(2,4 dimethylpentanenitrile) obtained from E.I. du Pont de Nemours and Company under the trade designation "VAZO 52", 0.25 grams of 2,2'-azobis(2-methylbutanenitrile) obtained from E.I. du Pont de Nemours and Company under the trade designation "VAZO 67", 0.25 grams of 2,2'-azobis(cyclohexanecarbonitrile) obtained from E.I. du Pont de Nemours and Company under the trade designation "VAZO 88", 0.25 grams of 2,5-dimethyl-2,5 di-(t-butylperoxy)hexane obtained from Elf Atochem under the trade designation "LUPERSOL 101", and 0.20 grams of 2,5-dimethyl-2,5-di-(t-butylperoxy) hexyne-3 obtained from Elf Atochem under the trade designation "LUPERSOL 130") and 33.83 grams of IOTG was then added to the product of the first step. The reactor was sealed and purged of oxygen with nitrogen, and then held at 5 psig nitrogen pressure. The reaction mixture was heated to 60° C. and then allowed to polymerize adiabatically. After the reaction reached peak temperature of 144° C., the mixture was held at 170° C. for 1 hour and drained, while hot, into aluminum trays. After the material cooled, the resulting solid polymer was hammered into flakes. The molecular weight of the oligomer was determined by GPC (THF, EMD Omnisolve,2c PL-Gel-2 300×7.5 mm, polystyrene standard): Mw=2,083, Mn=1,204, and a polydispersity of 1.73.

Preparative Example 3

Heptafluorobutyl Methacrylate

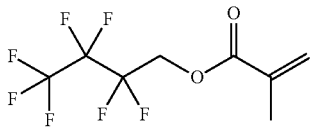 [SMILES: C=C(C)C(=O)OCC(F)(F)C(F)(F)C(F)(F)F]

Heptafluorobutanol (1890 grams, 9.45 moles), 30 grams of 95% sulfuric acid, 1.8 grams of phenothiazine, 1.5 grams of MEHQ were placed in a 3 liter flask that was fitted with an overhead stirrer, thermocouple, and a addition funnel. The reaction was heated to 55° C., and at that time the addition of methacrylic anhydride (1527 grams, 9.91 moles) was begun. The batch exothermed to 65° C., and the addition was adjusted to keep the reaction temperature at 65° C. At this time the set point of the controller was raised to 65° C. The addition of methacrylic anhydride was completed in 2.5 hours. The reaction mixture was then heated at 65° C. for 3 hours and then allowed to cool to room temperature. Analysis by gas chromatography (GC) indicated the material to be 0.4% unreacted heptafluorobutanol, 0.9% heptafluorobutyl acetate, 63.6 desired heptafluorobutyl methacrylate, 30.6% methacrylic acid, and 0.4 unreacted methacrylic anhydride.

1800 grams of water was added, and the batch was stirred for 30 minutes. The pH was measured at less than 2; analysis by GC showed the material to be 1.0% heptafluorobutyl acetate, 70.9 desired heptafluorobutyl methacrylate, 22.9% methacrylic acid, and 1.4% unreacted methacrylic anhydride. The black water phase was split off from the translucent olive/brown fluorochemical phase; 3006 grams of fluorochemical phase was obtained.

Another 1800 grams of water was added to the fluorochemical phase, and the batch was stirred for 30 minutes. The pH was measured at less than 2; analysis by GC showed the material to be 1.1% heptafluorobutyl acetate, 74.7% desired heptafluorobutyl methacrylate, 19% methacrylic acid, and 1.4% unreacted methacrylic anhydride. The light green water phase was split off from the translucent green flluorochemical phase; 2840 grams of fluorochemical phase was obtained.

The batch was allowed to split, and the translucent amethyst fluorochemical bottom phase was split off and saved. The fluorochemical phase was then stirred for 30 minutes with a mixture of 285 grams of potassium hydroxide and 1800 grams of water. The bottom raspberry colored fluorochemical phase was split off to give 2537 grams of the crude product; analysis by GC showed the material to be 1.3% heptafluorobutyl acetate, 88.3% desired heptafluorobutyl methacrylate, 6.7% methacrylic acid, and 1.4 unreacted methacrylic anhydride.

For the next wash the batch was added to 85 g of potassium carbonate dissolved in 1800 g of water and stirred for 30 min with the previously washed FC product. GC showed the material to be 1.3% heptafluorobutyl acetate and 94.4% desired heptafluorobutyl methacrylate. Methacrylic acid and unreacted methacrylic anhydride were not detected. The pH of the water layer was measured at 10-11. The product weighed 2275 grams. This material was washed again with 1800 grams of water for 30-minutes. The pH of the water layer was measured at 7-8. A total of 2235 grams of the product was isolated after separation of the water layer.

The crude heptafluorobutyl methacrylate was added to a 3 liter flask fitted with a distillation head and a thermocouple. More inhibitor (3 grams of phenothiazine and 0.7 gram of MEHQ) were added to the distillation pot. The acrylate was distilled to give 156 of precut distilling at 142 mm Hg at a head temperature of 80° C.-86° C. (88% desired methacrylate). The desired material distilled at 86° C.-° C. at 131 mm Hg; a total of 1934 grams of heptafluorobutyl methacrylate were obtained.

EXAMPLE 1, ILLUSTRATIVE EXAMPLE 1, COMPARATIVE EXAMPLE 1

Preparative Oligomer Examples 2 and 5 were extrusion compounded with a PVDF homopolymer (obtained from 3M Company, St. Paul, Minn., under the trade designation "DYNEON 6008") using a 25 mm twin screw extruder obtained from Werner Pfleiderer (now Coperion, Stuttgart, Germany). For each extrusion, the temperature was 480° F. (249° C.), and a total extrusion rate of 12 pounds per hour was used to produce films that were 10 inches wide and 0.002 inch thick. The oligomers used for Example 1 and Illustrative Example 1 are shown in Table 1, below. The final UVA wt % and HALS wt % in the film referred to in Table 1 refers to the wt % of the active UV absorbing unit or HALS unit in the oligomer. Oligomers were added at 10% by weight to provide 2% by weight of the active UV absorbing monomeric unit in the film and 5% by weight to provide 1% by weight of the active HALS monomeric unit in the film.

In Comparative Example 1, 2% by weight of a benzotriazole UV absorber obtained from BASF under the trade designation "TINUVIN 928" was also extrusion compounded into PVDF (obtained from 3M Company under the trade designation "DYNEON 6008"). Films were extruded using a 20/40 mm co-rotating twin screw extruder obtained from Brabender GmbH, Duisburg, Germany, equipped with a die and cast wheel to produce films that were 6 inches wide and 0.001 inch thick between two polyester liners. The die and extruder temperatures were 480° F. (249° C.). The extruder was set up with two feed hoppers to dispense the PVDF and the UV absorber. The extrusion rates of the PVDF and UV absorber were 980 grams/hour and 20 grams/hour, respectively. The concentration of the UV absorber is shown in Table 1, below.

TABLE 1

| Film Example | UVA | Wt. % active UVA | Wt. % active HALS | Wt % MMA from oligomer | Wt. % PVDF |
| --- | --- | --- | --- | --- | --- |
| Example 1 | Prep. Olig. 2 Prep. Olig. 5 | 2 | 1 | 12 | 85 |
| Ill. Ex. 1 | Prep. Olig. 2 | 2 | 0 | 8 | 90 |
| Comp. Ex. 1 | "TINUVIN 928" | 2 | 0 | Not applicable | 98 |

Average transmission in three different ranges for Example 1, Illustrative Example 1, and Comparative Example 1 were measured using a "LAMBDA 950" Spectrophotometer obtained from Lambda Scientific before and after Accelerated Ultraviolet Light Exposure according to the method described above. Two intervals were used for Example 1 and Illustrative Example 1, and one interval was used for Comparative Example 1. The results are shown in Table 2, below.

TABLE 2

| Film Example | Avg. Transmission 300 nm-380 nm (%) | | Avg. Transmission 380 nm to 450 nm (%) | | Avg. Transmission 400 nm to 750 nm (%) | |
|---|---|---|---|---|---|---|
| | initial | weathered | initial | weathered | initial | weathered |
| Example 1 | 1.4 | 1.7 | 80.4 | 81.1 | 87.5 | 87.9 |
| Illustrative Ex. 1 | 1.3 | 2.2 | 84.9 | 79.3 | 91.5 | 90.6 |
| Comp. Ex. 1 | 18.4 | 91.4 | 87.0 | 92.8 | 92.9 | 93.4 |

Example 2, Illustrative Example 2, and Comparative Example 2

Preparative Oligomer Examples 1 and 3 were each compounded with PVDF (obtained from 3M Company under the trade designation "DYNEON 6008") in a mixer obtained from Brabender, Duisburg, Germany. For comparison, Comparative Example 2 was made with a triazine UV absorber (obtained from BASF under the trade designation "TINUVIN 1600"). Samples were blended for 8 minutes and then pressed in a heated press at 450° F. (232° C.) to make 0.004-0.005 inch thick disks. The oligomers used for Example 2 and Illustrative Example 2 are shown in Table 3, below. The final UVA wt % and HALS wt % in the film referred to in Table 3 refers to the wt % of the active UV absorbing unit or HALS unit in the oligomer. Oligomers were added at 10% by weight to provide 2% by weight of the active UV absorbing monomeric unit in the film, for example.

TABLE 3

| Film Example | UVA | Wt. % active UVA | Wt. % active HALS | Wt % MMA from oligomer | Wt. % PVDF |
|---|---|---|---|---|---|
| Example 2 | Prep. Olig. 3 | 1 | 0.5 | 6 | 92.5 |
| Ill. Ex. 2 | Prep. Olig. 1 | 2 | 0 | 8 | 90 |
| Example 3 | Prep. Olig. 1 and "UVINUL 4050" | 2 | 1 | 8 | 89 |
| Comp. Ex. 2 | "TINUVIN 1600" | 2 | 0 | Not applicable | 98 |

Average transmission for Example 2, Illustrative Example 2, and Comparative Example 2 were measured using a "LAMBDA 950" Spectrophotometer obtained from Lambda Scientific before and after Accelerated Ultraviolet Light Exposure for two intervals according to the method described above. The results are shown in Table 4, below.

TABLE 4

| Film Example | Avg. Transmission 300 nm-380 nm (%) | | Avg. Transmission 380 nm to 450 nm (%) | | Avg. Transmission 400 nm-750 nm (%) | |
|---|---|---|---|---|---|---|
| | initial | 2 intervals | initial | 2 intervals | inital | 2 intervals |
| Example 2 | 0.6 | 1.0 | 56.7 | 57.3 | 81.7 | 83.8 |
| Example 3 | 0.3 | 0.3 | 48.5 | 48.5 | 78.8 | 80.1 |
| Illustrative Ex. 2 | 0.2 | 6.4 | 48.2 | 59.1 | 78.7 | 83.6 |
| Comp. Ex. 2 | 0.1 | 24.5 | 29.4 | 48.1 | 61.5 | 57.1 |

Example 3

Example 2 was prepared according to the method of Illustrative Example 2 with the modification that 1% of N,N'-bisformyl-N,N'-bis-(2,2,6,6-tetramethyl-4-piperidinyl) hexamethylenediamine obtained from BASF under the trade designation "UVINUL 4050 FF" was used as a hindered amine light stabilizer. The composition of Example 3 is shown in Table 3, and the transmission before and after weathering is shown in Table 4, above.

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A composition comprising a blend of a fluoropolymer and an ultraviolet light-absorbing oligomer, wherein the ultraviolet light-absorbing oligomer comprises:
   a first divalent unit comprising a pendent ultraviolet absorbing group; and
   a second divalent unit represented by formula:

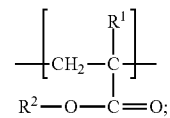

wherein
   R$^1$ is hydrogen or methyl; and
   R$^2$ is alkyl having from 1 to 4 carbon atoms,
   and wherein at least one of the following limitations is met:
   the ultraviolet light-absorbing oligomer further comprises a third divalent unit comprising a pendent 2,2,6,6-tetramethylpiperidinyl group; or
   the composition further comprises a second oligomer comprising a third divalent unit comprising a pendent 2,2,6,6-tetramethylpiperidinyl group and at least one of the second divalent units, wherein the nitrogen of the pendent 2,2,6,6-tetramethylpiperidinyl group is substituted by hydrogen, alkyl, oxy, alkoxy, or alkanone.

2. The composition of claim 1, wherein the composition is an extruded film.

3. The composition of claim 1, wherein the pendent ultraviolet absorbing group comprises a triazine, a benzophenone, or a benzotriazole.

4. The composition of claim 1, wherein the first divalent unit is represented by formula:

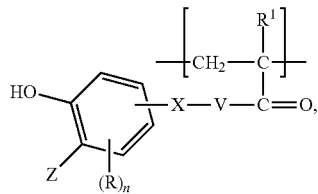

wherein
R$^1$ is independently hydrogen or methyl;
V is O or NH;
X is a bond, alkylene, or alkyleneoxy, wherein the alkylene or alkyleneoxy have from 1 to 10 carbon atoms and are optionally interrupted by one or more —O— groups and optionally substituted by a hydroxyl group;
R is alkyl having from one to four carbon atoms;
n is 0 or 1; and
Z is a benzoyl group optionally substituted by alkyl, halogen, or hydroxyl; a 4,6-bisphenyl[1,3,5]triazin-2-yl group wherein each phenyl is optionally independently substituted by one or more alkyl or alkoxy groups; or a 2H-benzotriazol-2-yl group optionally substituted by one or more halogens.

5. The composition of claim 1, wherein the third divalent unit is represented by formula:

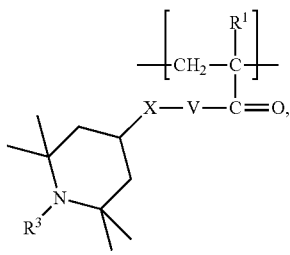

wherein
R$^1$ is independently hydrogen or methyl;
X is a bond, alkylene, or alkyleneoxy, wherein the alkylene or alkyleneoxy have from 1 to 10 carbon atoms and are optionally interrupted by one or more —O— groups and optionally substituted by a hydroxyl group;
V is O or NH; and
R$^3$ is hydrogen, alkyl, oxy, alkoxy, or alkanone.

6. The composition of claim 1, wherein at least one of the ultraviolet light-absorbing oligomer or the second oligomer further comprises a fourth divalent unit represented by formula:

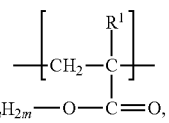

wherein
Rf represents a fluoroalkyl group having from 1 to 8 carbon atoms optionally interrupted by one —O— group, or Rf represents a polyfluoropolyether group;
R$^1$ is independently hydrogen or methyl;
Q is a bond, —SO$_2$—N(R$^5$)—, or —C(O)—N(R$^5$)—, wherein R$^5$ is alkyl having from 1 to 4 carbon atoms or hydrogen; and
m is an integer from 0 to 10.

7. The composition of claim 1, wherein the ultraviolet light-absorbing oligomer comprises the third divalent unit.

8. The composition of claim 1, wherein the composition comprises the second oligomer.

9. The composition of claim 1, wherein the ultraviolet light-absorbing oligomer is in the composition in an amount ranging from 1 percent to 25 percent by weight, based on the total weight of the composition.

10. The composition of claim 1, wherein in the second divalent unit, R$^1$ and R$^2$ are both methyl.

11. The composition of claim 1, wherein the fluoropolymer is present in the blend in an amount of at least 70 percent by weight, based on the total weight of the blend.

12. The composition of claim 1, wherein the blend further comprises poly(methyl methacrylate).

13. The composition of claim 1, wherein the fluoropolymer is selected from the group consisting of ethylene-tetrafluoroethylene copolymer, a tetrafluoroethylene-hexafluoropropylene copolymer, a tetrafluoroethylene-hexafluoropropylene-vinylidene fluoride copolymer, and polyvinylidene fluoride.

14. An article comprising the composition of claim 1, wherein the article is a photovoltaic device, vehicle wrap, graphic film, anti-graffiti film, architectural film, or window film.

15. A method of making the composition of claim 2, the method comprising:
combining the fluoropolymer, the ultraviolet light-absorbing oligomer, and optionally the second oligomer to form the blend; and
extruding the blend into a film.

16. The composition of claim 2, wherein the extruded film is a multilayer film.

17. The composition of claim 2, wherein the extruded film is a multilayer optical film.

18. The composition of claim 1, wherein the pendent ultraviolet absorbing group comprises a triazine.

19. The composition of claim 1, wherein the ultraviolet light-absorbing oligomer has a number average molecular weight of less than 150,000 grams per mole and wherein R$^1$ and R$^2$ are both methyl.

20. The composition of claim 1, wherein the second oligomer has a number average molecular weight of up to 150,000 grams per mole and wherein R$^1$ and R$^2$ are both methyl.

* * * * *

UNITED STATES PATENT AND TRADEMARK OFFICE
CERTIFICATE OF CORRECTION

Page 1 of 2

PATENT NO. : 10,125,251 B2
APPLICATION NO. : 15/320544
DATED : November 13, 2018
INVENTOR(S) : David Olson It is certified that error appears in the above-identified patent and that said Letters Patent is hereby corrected as shown below:

In the Specification

Column 6

Line 55-63 (approx.), delete " " and insert -- -- , therefor.

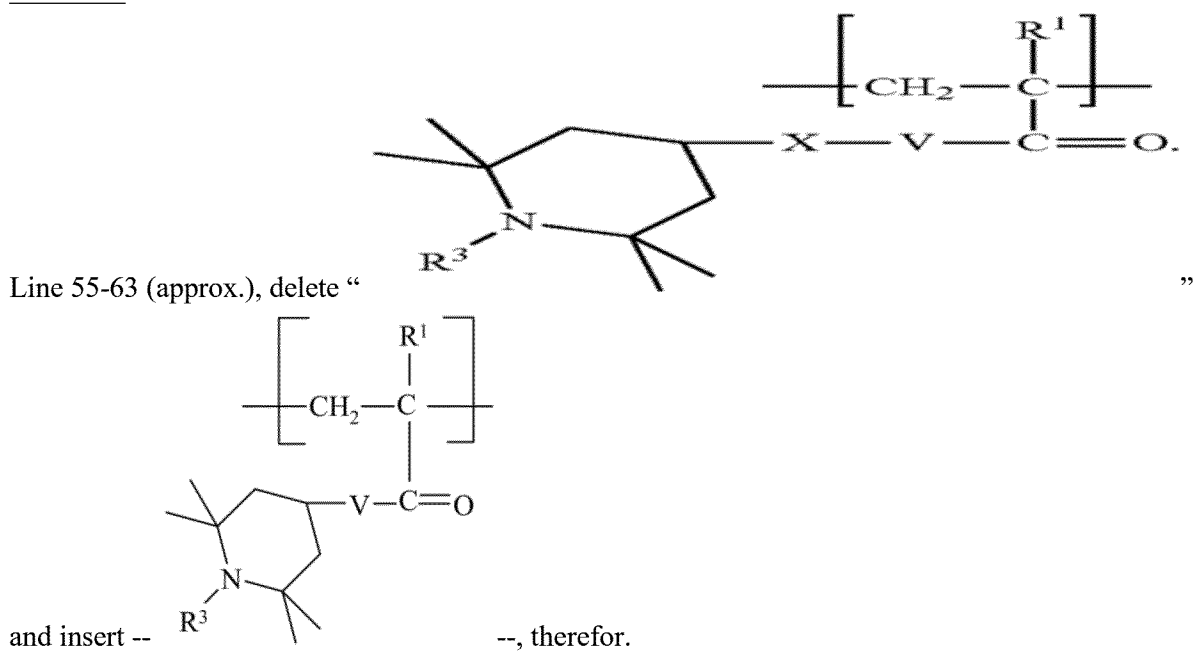

Column 8
Line 25, delete "pefluoroisopentyl," and insert -- perfluoroisopentyl, --, therefor.
Line 65, delete "methyl)" and insert -- methyl). --, therefor.

Column 16
Line 17, delete "PDVF" and insert -- PVDF --, therefor.

Signed and Sealed this
Tenth Day of May, 2022

Katherine Kelly Vidal
*Director of the United States Patent and Trademark Office*

CERTIFICATE OF CORRECTION (continued)
U.S. Pat. No. 10,125,251 B2

Column 18
Line 35, delete "secacate." and insert -- sebacate. --, therefor.

Column 21
Line 13, delete "anti-grafitti" and insert -- anti-graffiti --, therefor.

Column 33
Line 44, delete "flluorochemical" and insert -- fluorochemical --, therefor.

Column 35-36
Line 52 (approx.), delete "inital" and insert -- initial --, therefor.